US012621103B2

(12) United States Patent
Xiao et al.

(10) Patent No.: US 12,621,103 B2
(45) Date of Patent: May 5, 2026

(54) TECHNIQUES FOR MAPPING SOUNDING REFERENCE SIGNAL RESOURCES

(71) Applicant: QUALCOMM INCORPORATED, San Diego, CA (US)

(72) Inventors: Kexin Xiao, Shanghai (CN); Muhammad Sayed Khairy Abdelghaffar, San Jose, CA (US); Yu Zhang, San Diego, CA (US); Bo Chen, Beijing (CN); Runxin Wang, San Diego, CA (US); Yeliz Tokgoz, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 18/044,729

(22) PCT Filed: Oct. 29, 2020

(86) PCT No.: PCT/CN2020/124698
§ 371 (c)(1),
(2) Date: Mar. 9, 2023

(87) PCT Pub. No.: WO2022/087948
PCT Pub. Date: May 5, 2022

(65) Prior Publication Data
US 2023/0370229 A1 Nov. 16, 2023

(51) Int. Cl.
*H04B 7/0404* (2017.01)
*H04L 5/00* (2006.01)
*H04W 8/22* (2009.01)

(52) U.S. Cl.
CPC ............. *H04L 5/0051* (2013.01); *H04W 8/22* (2013.01)

(58) Field of Classification Search
CPC ... H04L 5/0051; H04L 5/0023; H04L 5/0094; H04B 7/0602; H04B 7/0802; H04B 7/0404; H04W 8/22
(Continued)

(56) References Cited

U.S. PATENT DOCUMENTS 10,624,118 B2 * 4/2020 Park ................... H04L 25/03343
11,277,240 B2 * 3/2022 Zhang ................... H04B 7/0695
(Continued)

FOREIGN PATENT DOCUMENTS

CN 108023697 A 5/2018
CN 111226411 A 6/2020
(Continued)

OTHER PUBLICATIONS

5G; NR; Multiplexing and channel coding 3GPP TS 38.212 version 16.2.0 Release 16; ETSI TS 138 212 V16.2.0 (Jul. 2020) (Year: 2020).*
(Continued)

*Primary Examiner* — Christopher M Crutchfield
*Assistant Examiner* — Syed Ahmed
(74) *Attorney, Agent, or Firm* — Holland & Hart LLP/Qualcomm

(57) ABSTRACT

Methods, systems, and devices for wireless communications are described. A base station may receive a capability message from a user equipment (UE) based on a number of receive antennas exceeding a number of transmit antennas at the UE. The base station may configure the UE with a mapping between sounding reference signal (SRS) resources and bit sequences, or SRS resource indices (SRIs), based on the capability message. The base station may transmit a control message including one or more SRIs indicating respective SRS resources. The UE may use the one or more SRIs included in a control message from the
(Continued)

Transmit a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission — 1905

Receive, based at least in part on the capability message, an SRS configuration for a plurality of SRS resources that indicates a mapping between each SRS resource for at least a subset of the plurality of SRS resources and a respective bit sequence of a plurality of bit sequences — 1910

Receive a control message comprising a first bit sequence of the plurality of bit sequences to indicate a first SRS resource of the subset of the plurality of SRS resources based at least in part on the mapping — 1915

Transmit a first sounding reference signal in the first SRS resource based at least in part on the control message — 1920

1900 base station to select respective SRS resources from a resource set. Once the UE selects one or more SRS resources, the UE may transmit one or more SRSs in the SRS resources.

20 Claims, 23 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 11,425,743 | B2 * | 8/2022 | Liou | .................... H04B 7/0626 |
| 12,101,274 | B2 * | 9/2024 | Go | ......................... H04L 5/0053 |
| 2019/0356431 | A1 | 11/2019 | Manolakos et al. | |
| 2021/0083825 | A1 * | 3/2021 | Choi | .................... H04L 5/0023 |
| 2022/0271815 | A1 * | 8/2022 | Zhang | .................. H04L 5/0051 |
| 2022/0353042 | A1 * | 11/2022 | Gao | ....................... H04W 16/28 |
| 2022/0368405 | A1 * | 11/2022 | Shi | ........................ H04B 7/0691 |
| 2023/0045308 | A1 * | 2/2023 | Guan | .................... H04L 5/0051 |
| 2023/0047048 | A1 * | 2/2023 | Liu | ....................... H04B 7/0417 |

FOREIGN PATENT DOCUMENTS

| | | | | |
|---|---|---|---|---|
| WO | WO-2019028836 | A1 | 2/2019 | |
| WO | WO-2019037158 | | 2/2019 | |
| WO | WO-2019170089 | A1 * | 9/2019 | ............ H04W 72/23 |

OTHER PUBLICATIONS

3GPP TS 38.214: "3rd Generation Partnership Project, Technical Specification Group Radio Access Network, NR, Physical layer Procedures for Data ( Release 16)", 3GPP Draft, Draft 38214-G20, 3rd Generation Partnership Project, Mobile Competence Centre, 650, Route Des Lucioles, F-06921 Sophia-Antipolis Cedex, France, Jun. 2020, 3GPP TS 38.214 V16.2.0, Jul. 16, 2020, XP051909211, pp. 1-163, Sections 6.2.1, 6.2.1.2.

Sony: "Summary of SRS", 3GPP Draft, 3GPP TSG RAN WG1 Ad Hoc-1801 Meeting, R1-1801005-Summary of SRS V0.2, 3rd Generation Partnership Project, Mobile Competence Centre, 650, Route Des Lucioles, F-06921 Sophia-Antipolis Cedex, France, vol. Ran WG1, No. Vancouver, CA, Jan. 22, 2018-Jan. 26, 2018, Jan. 23, 2018, XP051385247, 37 pages, p. 36, "Proposal 8 [..]", Fig. 1.

Supplementary European Search Report—EP20959111—Search Authority—The Hague—Jul. 15, 2024.

Huawei, et al., "Antenna Selection Transmission for PUSCH", 3GPP Draft, 3GPP TSG Ran WG1 NR Ad Hoc Meeting#4, R1-1800909, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051385158, 3 Pages, pp. 1-3, the whole document.

International Search Report and Written Opinion—PCT/CN2020/124698—ISA/EPO—Jul. 15, 2021.

* cited by examiner

SRS Resource

Slot 220

205

115-a

210

105-a 110-a

Resource Set 1

Resource Set 2

SRS 215

Control Message 225

Capability Message 230

200

600

1510

1520

1515

1505

1500

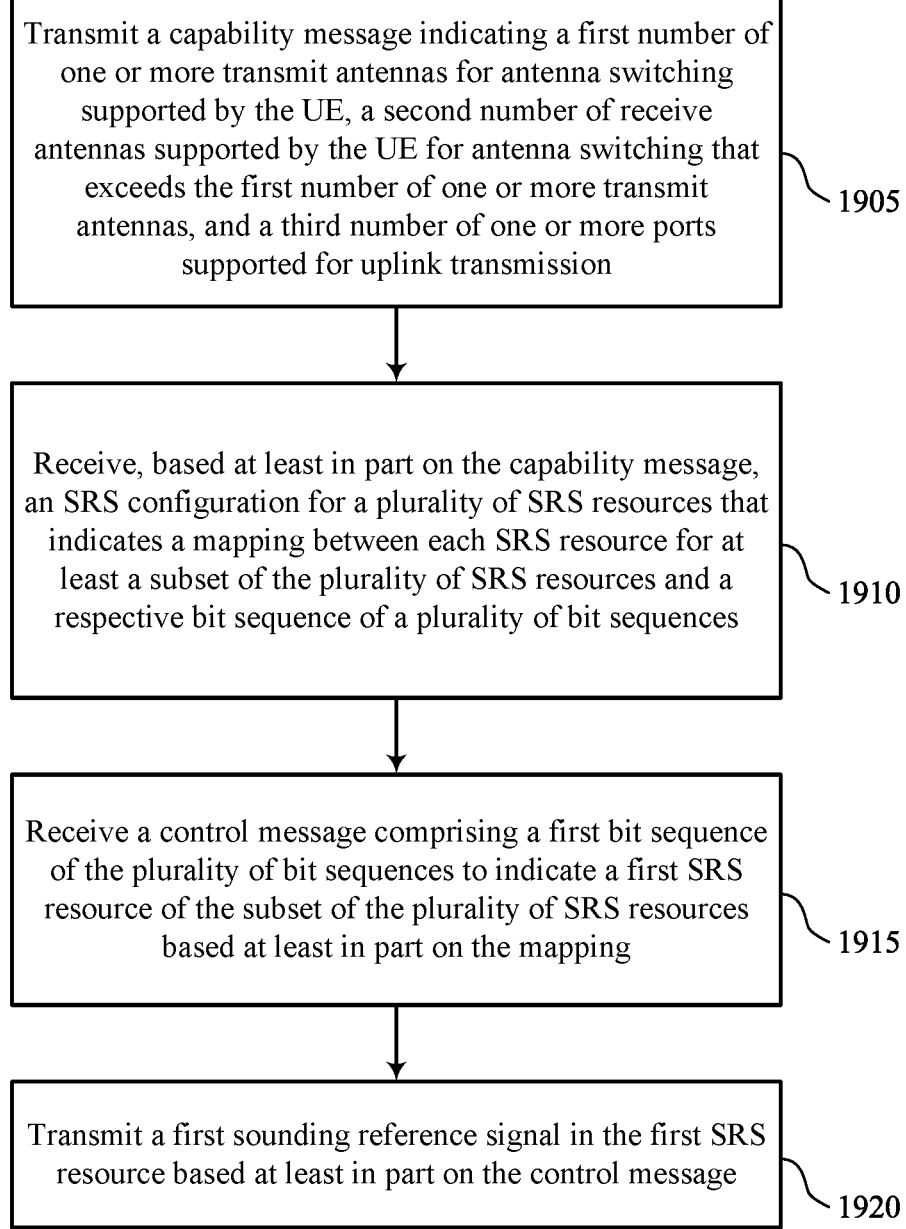

Transmit a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission

1905

Receive, based at least in part on the capability message, an SRS configuration for a plurality of SRS resources that indicates a mapping between each SRS resource for at least a subset of the plurality of SRS resources and a respective bit sequence of a plurality of bit sequences

1910

Receive a control message comprising a first bit sequence of the plurality of bit sequences to indicate a first SRS resource of the subset of the plurality of SRS resources based at least in part on the mapping

1915

Transmit a first sounding reference signal in the first SRS resource based at least in part on the control message

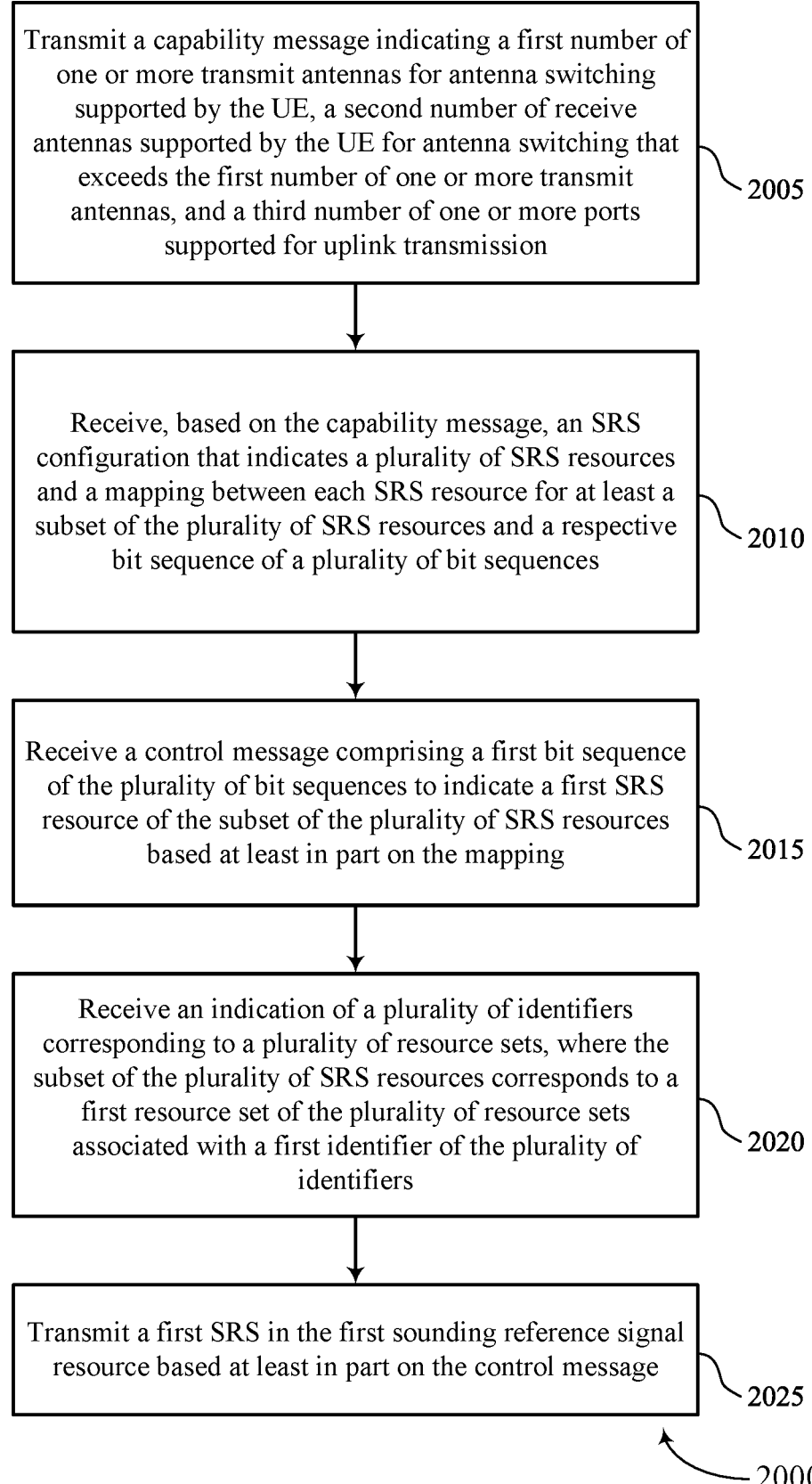

Transmit a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission — 2005

Receive, based on the capability message, an SRS configuration that indicates a plurality of SRS resources and a mapping between each SRS resource for at least a subset of the plurality of SRS resources and a respective bit sequence of a plurality of bit sequences — 2010

Receive a control message comprising a first bit sequence of the plurality of bit sequences to indicate a first SRS resource of the subset of the plurality of SRS resources based at least in part on the mapping — 2015

Receive an indication of a plurality of identifiers corresponding to a plurality of resource sets, where the subset of the plurality of SRS resources corresponds to a first resource set of the plurality of resource sets associated with a first identifier of the plurality of identifiers — 2020

Transmit a first SRS in the first sounding reference signal resource based at least in part on the control message — 2025

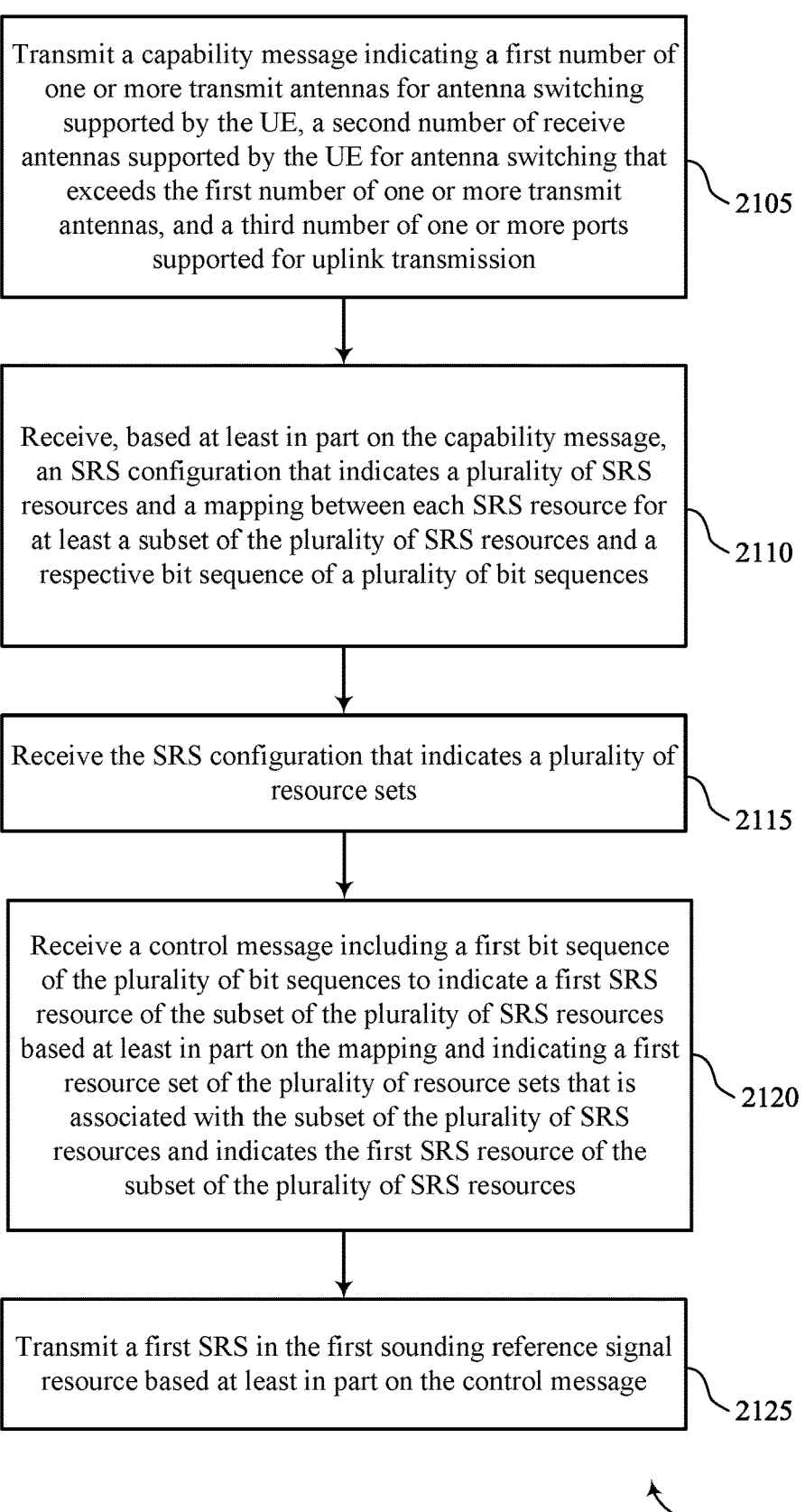

Transmit a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission

2105

Receive, based at least in part on the capability message, an SRS configuration that indicates a plurality of SRS resources and a mapping between each SRS resource for at least a subset of the plurality of SRS resources and a respective bit sequence of a plurality of bit sequences

2110

Receive the SRS configuration that indicates a plurality of resource sets

2115

Receive a control message including a first bit sequence of the plurality of bit sequences to indicate a first SRS resource of the subset of the plurality of SRS resources based at least in part on the mapping and indicating a first resource set of the plurality of resource sets that is associated with the subset of the plurality of SRS resources and indicates the first SRS resource of the subset of the plurality of SRS resources

2120

Transmit a first SRS in the first sounding reference signal resource based at least in part on the control message

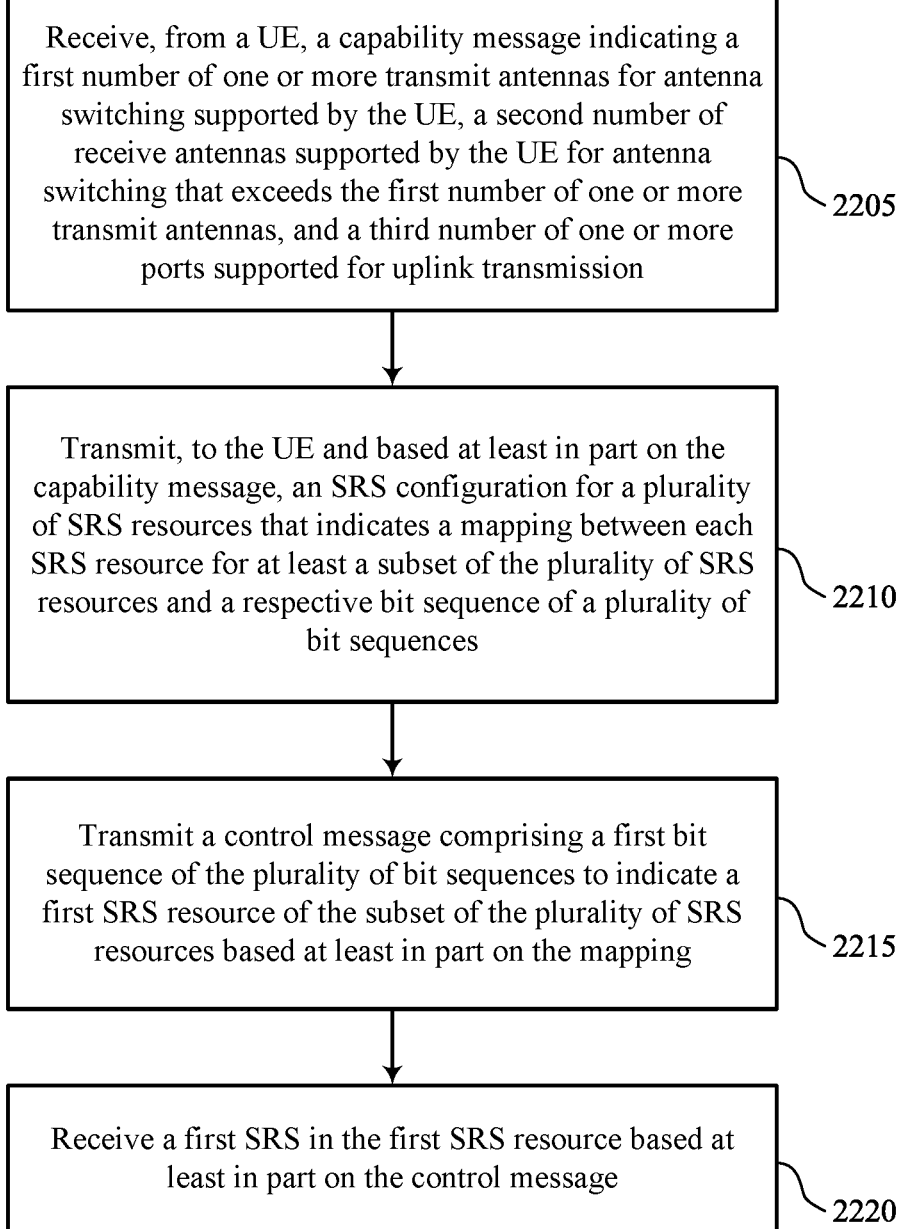

Receive, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission

2205

Transmit, to the UE and based at least in part on the capability message, an SRS configuration for a plurality of SRS resources that indicates a mapping between each SRS resource for at least a subset of the plurality of SRS resources and a respective bit sequence of a plurality of bit sequences

2210

Transmit a control message comprising a first bit sequence of the plurality of bit sequences to indicate a first SRS resource of the subset of the plurality of SRS resources based at least in part on the mapping

2215

Receive a first SRS in the first SRS resource based at least in part on the control message

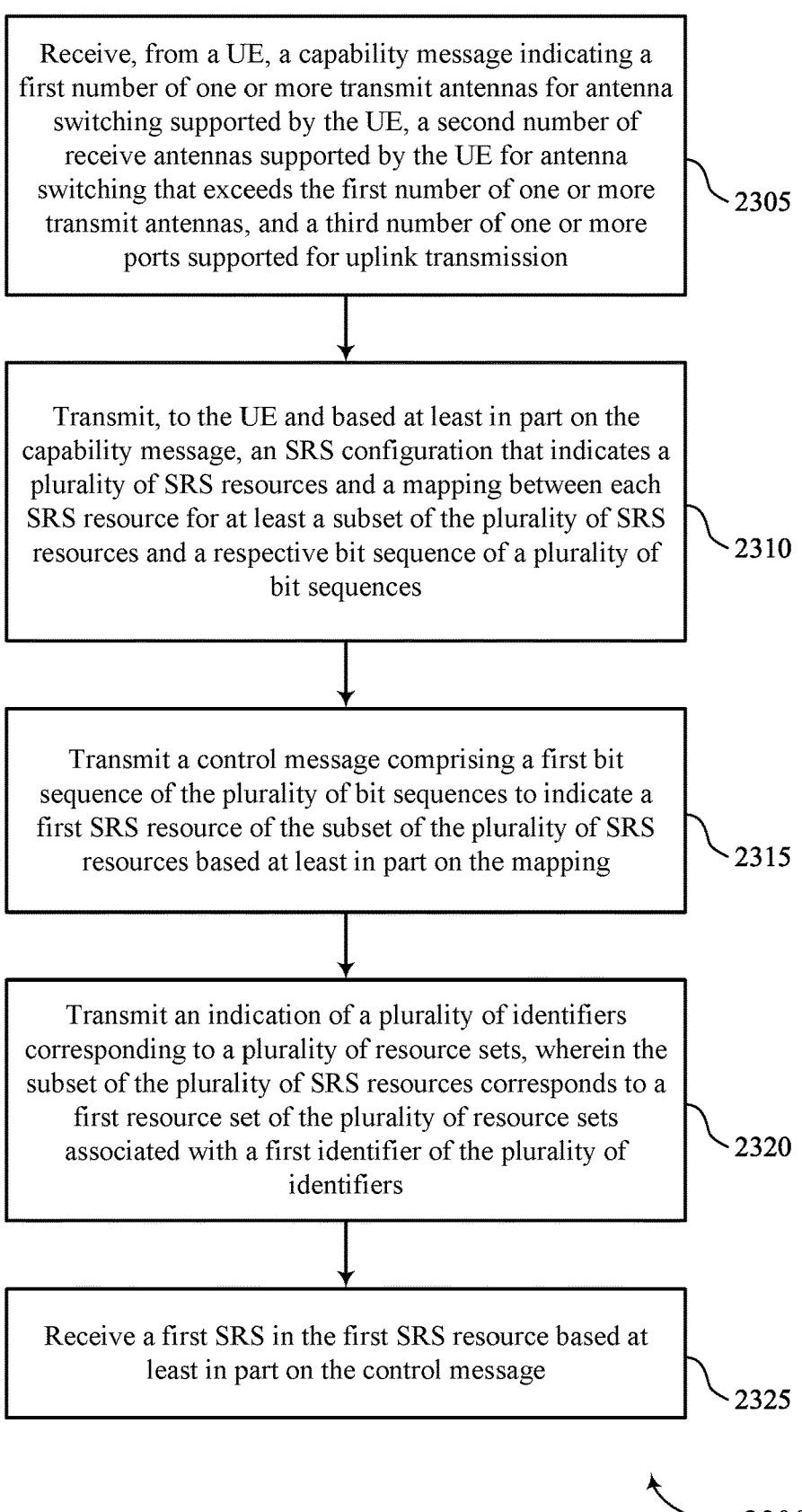

Receive, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission

2305

Transmit, to the UE and based at least in part on the capability message, an SRS configuration that indicates a plurality of SRS resources and a mapping between each SRS resource for at least a subset of the plurality of SRS resources and a respective bit sequence of a plurality of bit sequences

2310

Transmit a control message comprising a first bit sequence of the plurality of bit sequences to indicate a first SRS resource of the subset of the plurality of SRS resources based at least in part on the mapping

2315

Transmit an indication of a plurality of identifiers corresponding to a plurality of resource sets, wherein the subset of the plurality of SRS resources corresponds to a first resource set of the plurality of resource sets associated with a first identifier of the plurality of identifiers

2320

Receive a first SRS in the first SRS resource based at least in part on the control message

TECHNIQUES FOR MAPPING SOUNDING REFERENCE SIGNAL RESOURCES

CROSS REFERENCE

The present application is a 371 national stage filing of International PCT Application No. PCT/CN2020/124698 by Xiao et al. entitled "TECHNIQUES FOR MAPPING SOUNDING REFERENCE SIGNAL RESOURCES," filed Oct. 29, 2020, which is assigned to the assignee hereof, and which is expressly incorporated by reference in its entirety herein.

FIELD OF TECHNOLOGY

The following relates to wireless communications, including techniques for mapping sounding reference signal (SRS) resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for mapping sounding reference signal (SRS) resources. Generally, the described techniques provide for a base station to configure a user equipment (UE) with a mapping between SRS resources and bit sequences, or SRS resource indices (SRIs), based on a capability message from the UE. In some cases, the UE may use one or more SRIs included in a control message from the base station to select respective SRS resources from a default resource set (e.g., the resource set with a smallest identifier). In some other cases, the base station may include an SRS set indicator in the control message in addition to the one or more SRIs. In some examples, the base station may build a lookup table, and configure the UE with the mapping table, to map the one or more SRIs in the control message to each SRS resource (e.g., based on a bit sequence) in one resource set or multiple resource sets. In some other examples, the UE may use the one or more SRIs in the control message to select SRS resources from a static virtual resource set, which may be indicated in control signaling, or a dynamic virtual set, which may be based on a slot index. Once the UE selects one or more SRS resources, the UE may transmit one or more SRSs in the SRS resources.

A method for wireless communication at a user equipment (UE) is described. The method may include transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, receiving, based on the capability message, an SRS configuration for a set of multiple SRS resources that indicates a mapping between each SRS resource for at least a subset of the set of multiple SRS resources and a respective bit sequence of a set of multiple bit sequences, receiving a control message including a first bit sequence of the set of multiple bit sequences to indicate a first SRS resource of the subset of the set of multiple SRS resources based on the mapping, and transmitting a first SRS in the first SRS resource based on the control message.

An apparatus for wireless communication at a UE is described. The apparatus may include a processor, memory in electronic communication with the processor, and instructions stored in the memory. The instructions may be executable by the processor to cause the apparatus to transmit a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, receive, based on the capability message, an SRS configuration for a set of multiple SRS resources that indicates a mapping between each SRS resource for at least a subset of the set of multiple SRS resources and a respective bit sequence of a set of multiple bit sequences, receive a control message including a first bit sequence of the set of multiple bit sequences to indicate a first SRS resource of the subset of the set of multiple SRS resources based on the mapping, and transmit a first SRS in the first SRS resource based on the control message.

Another apparatus for wireless communication at a UE is described. The apparatus may include means for transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, means for receiving, based on the capability message, an SRS configuration for a set of multiple SRS resources that indicates a mapping between each SRS resource for at least a subset of the set of multiple SRS resources and a respective bit sequence of a set of multiple bit sequences, means for receiving a control message including a first bit sequence of the set of multiple bit sequences to indicate a first SRS resource of the subset of the set of multiple SRS resources based on the mapping, and means for transmitting a first SRS in the first SRS resource based on the control message.

A non-transitory computer-readable medium storing code for wireless communication at a UE is described. The code may include instructions executable by a processor to transmit a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, receive, based on the capability message, an SRS configuration for a set of multiple SRS resources that indicates a mapping between each SRS resource for at least a subset of the set of multiple SRS resources and a respective bit sequence of a set of multiple bit sequences, receive a control message including a first bit sequence of the set of multiple bit sequences to indicate a first SRS resource of the subset of the set of multiple SRS resources based on the mapping, and transmit a first SRS in the first SRS resource based on the control message.

In some examples of the method, apparatuses, and non-transitory computer-readable medium described herein, receiving the control message may include operations, features, means, or instructions for receiving an indication of a set of multiple identifiers corresponding to a set of multiple resource sets, where the subset of the set of multiple SRS resources corresponds to a first resource set of the set of multiple resource sets associated with a first identifier of the set of multiple identifiers.

In some examples of the method, apparatuses, and non-transitory computer-readable medium described herein, the first identifier may be a highest or lowest identifier of the set of multiple identifiers corresponding to the set of multiple resource sets.

In some examples of the method, apparatuses, and non-transitory computer-readable medium described herein, receiving the SRS configuration may include operations, features, means, or instructions for receiving the SRS configuration that indicates a set of multiple resource sets, where the control message indicates a first resource set of the set of multiple resource sets that may be associated with the subset of the set of multiple SRS resources and indicates the first SRS resource of the subset of the set of multiple SRS resources.

In some examples of the method, apparatuses, and non-transitory computer-readable medium described herein, receiving the control message may include operations, features, means, or instructions for receiving the control message including a set indicator having a value of zero indicating the first resource set of the set of multiple resource sets.

In some examples of the method, apparatuses, and non-transitory computer-readable medium described herein, receiving the control message may include operations, features, means, or instructions for receiving the control message including a set indicator having a non-zero value indicating the first resource set of the set of multiple resource sets.

In some examples of the method, apparatuses, and non-transitory computer-readable medium described herein, receiving the control message may include operations, features, means, or instructions for receiving the control message including a resource indicator having a value of zero indicating the first SRS resource of the subset of the set of multiple SRS resources.

In some examples of the method, apparatuses, and non-transitory computer-readable medium described herein, receiving the control message may include operations, features, means, or instructions for receiving the control message including a resource indicator having a non-zero value indicating the first SRS resource of the subset of the set of multiple SRS resources.

In some examples of the method, apparatuses, and non-transitory computer-readable medium described herein, receiving the SRS configuration may include operations, features, means, or instructions for receiving, based on the capability message, the SRS configuration that indicates a single resource set associated with the set of multiple SRS resources, where the mapping indicates a mapping between each SRS resource of the set of multiple SRS resources and a respective bit sequence of the set of multiple bit sequences.

Some examples of the method, apparatuses, and non-transitory computer-readable medium described herein may further include operations, features, means, or instructions for receiving, based on the capability message, the SRS configuration that indicates a set of multiple resource sets, each SRS resource of the set of multiple SRS resources being associate with a respective resource set of the set of multiple resource sets, where the mapping indicates a mapping between each SRS resource of the set of multiple SRS resources and a respective bit sequence of the set of multiple bit sequences.

In some examples of the method, apparatuses, and non-transitory computer-readable medium described herein, receiving the SRS configuration may include operations, features, means, or instructions for receiving the SRS configuration that indicates a virtual resource set including the subset of the set of multiple SRS resources, where the virtual resource set includes the first SRS resource from a first resource set and a second SRS resource from a second resource set.

In some examples of the method, apparatuses, and non-transitory computer-readable medium described herein, receiving the SRS configuration may include operations, features, means, or instructions for receiving the SRS configuration that indicates a virtual resource set including the subset of the set of multiple SRS resources, where the first SRS resource may be included in the subset of the set of multiple SRS resources based on a slot index corresponding to the control message.

In some examples of the method, apparatuses, and non-transitory computer-readable medium described herein, receiving the control message may include operations, features, means, or instructions for receiving the control message that indicates a resource set identifier of a first resource set corresponding to the set of multiple SRS resources.

In some examples of the method, apparatuses, and non-transitory computer-readable medium described herein, the first bit sequence includes a single bit.

In some examples of the method, apparatuses, and non-transitory computer-readable medium described herein, the first number of one or more transmit antennas and the third number of one or more ports may be the same.

A method for wireless communication at a base station is described. The method may include receiving, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, transmitting, to the UE and based on the capability message, an SRS configuration for a set of multiple SRS resources that indicates a mapping between each SRS resource for at least a subset of the set of multiple SRS resources and a respective bit sequence of a set of multiple bit sequences, transmitting a control message including a first bit sequence of the set of multiple bit sequences to indicate a first SRS resource of the subset of the set of multiple SRS resources based on the mapping, and receiving a first SRS in the first SRS resource based on the control message.

An apparatus for wireless communication at a base station is described. The apparatus may include a processor, memory in electronic communication with the processor, and instructions stored in the memory. The instructions may be executable by the processor to cause the apparatus to receive, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, transmit, to the UE and based on the capability message, an SRS configuration for a set of multiple SRS resources that indicates a mapping between each SRS resource for at least a subset of the set of multiple SRS resources and a respective bit sequence of a set of multiple bit sequences, transmit a control message including a first bit sequence of the set of multiple bit sequences to indicate a first SRS resource of the subset of the set of multiple SRS resources based on the mapping, and receive a first SRS in the first SRS resource based on the control message.

Another apparatus for wireless communication at a base station is described. The apparatus may include means for receiving, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, means for transmitting, to the UE and based on the capability message, an SRS configuration for a set of multiple SRS resources that indicates a mapping between each SRS resource for at least a subset of the set of multiple SRS resources and a respective bit sequence of a set of multiple bit sequences, means for transmitting a control message including a first bit sequence of the set of multiple bit sequences to indicate a first SRS resource of the subset of the set of multiple SRS resources based on the mapping, and means for receiving a first SRS in the first SRS resource based on the control message.

A non-transitory computer-readable medium storing code for wireless communication at a base station is described. The code may include instructions executable by a processor to receive, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, transmit, to the UE and based on the capability message, an SRS configuration for a set of multiple SRS resources that indicates a mapping between each SRS resource for at least a subset of the set of multiple SRS resources and a respective bit sequence of a set of multiple bit sequences, transmit a control message including a first bit sequence of the set of multiple bit sequences to indicate a first SRS resource of the subset of the set of multiple SRS resources based on the mapping, and receive a first SRS in the first SRS resource based on the control message.

In some examples of the method, apparatuses, and non-transitory computer-readable medium described herein, transmitting the control message may include operations, features, means, or instructions for transmitting an indication of a set of multiple identifiers corresponding to a set of multiple resource sets, where the subset of the set of multiple SRS resources corresponds to a first resource set of the set of multiple resource sets associated with a first identifier of the set of multiple identifiers.

In some examples of the method, apparatuses, and non-transitory computer-readable medium described herein, the first identifier may be a highest or lowest identifier of the set of multiple identifiers corresponding to the set of multiple resource sets.

In some examples of the method, apparatuses, and non-transitory computer-readable medium described herein, transmitting the SRS configuration may include operations, features, means, or instructions for transmitting the SRS configuration that indicates a set of multiple resource sets, where the control message indicates a first resource set of the set of multiple resource sets that may be associated with the subset of the set of multiple SRS resources and indicates the first SRS resource of the subset of the set of multiple SRS resources.

In some examples of the method, apparatuses, and non-transitory computer-readable medium described herein, transmitting the control message may include operations, features, means, or instructions for transmitting the control message including a set indicator having a value of zero indicating the first resource set of the set of multiple resource set.

In some examples of the method, apparatuses, and non-transitory computer-readable medium described herein, transmitting the control message may include operations, features, means, or instructions for transmitting the control message including a set indicator having a non-zero value indicating the first resource set of the set of multiple resource sets.

In some examples of the method, apparatuses, and non-transitory computer-readable medium described herein, transmitting the control message may include operations, features, means, or instructions for transmitting the control message including a resource indicator having a value of zero indicating the first SRS resource of the subset of the set of multiple SRS resources.

In some examples of the method, apparatuses, and non-transitory computer-readable medium described herein, transmitting the control message may include operations, features, means, or instructions for transmitting the control message including a resource indicator having a non-zero value indicating the first SRS resource of the subset of the set of multiple SRS resources.

In some examples of the method, apparatuses, and non-transitory computer-readable medium described herein, transmitting the SRS configuration may include operations, features, means, or instructions for transmitting, based on the capability message, the SRS configuration that indicates a single resource set associated with the set of multiple SRS resources, where the mapping indicates a mapping between each SRS resource of the set of multiple SRS resources and a respective bit sequence of the set of multiple bit sequences.

Some examples of the method, apparatuses, and non-transitory computer-readable medium described herein may further include operations, features, means, or instructions for transmitting, based on the capability message, the SRS configuration that indicates a set of multiple resource sets, each SRS resource of the set of multiple SRS resources being associate with a respective resource set of the set of multiple resource sets, where the mapping indicates a mapping between each SRS resource of the set of multiple SRS resources and a respective bit sequence of the set of multiple bit sequences.

In some examples of the method, apparatuses, and non-transitory computer-readable medium described herein, transmitting the SRS configuration may include operations, features, means, or instructions for transmitting the SRS configuration that indicates a virtual resource set including the subset of the set of multiple SRS resources, where the virtual resource set includes the first SRS resource from a first resource set and a second SRS resource from a second resource set.

In some examples of the method, apparatuses, and non-transitory computer-readable medium described herein, transmitting the SRS configuration may include operations, features, means, or instructions for transmitting the SRS configuration that indicates a virtual resource set including the subset of the set of multiple SRS resources, where the first SRS resource may be included in the subset of the set of multiple SRS resources based on a slot index corresponding to the control message.

In some examples of the method, apparatuses, and non-transitory computer-readable medium described herein, transmitting the control message may include operations, features, means, or instructions for transmitting the control message that indicates a resource set identifier of a first resource set corresponding to the set of multiple SRS resources.

In some examples of the method, apparatuses, and non-transitory computer-readable medium described herein, the first bit sequence includes a single bit.

In some examples of the method, apparatuses, and non-transitory computer-readable medium described herein, the first number of one or more transmit antennas and the third number of one or more ports may be the same.

BRIEF DESCRIPTION OF THE DRAWINGS

FIGS. 19 through 23 show flowcharts illustrating methods that support techniques for mapping SRS resources in accordance with aspects of the present disclosure.

8

DETAILED DESCRIPTION

Figure 1:
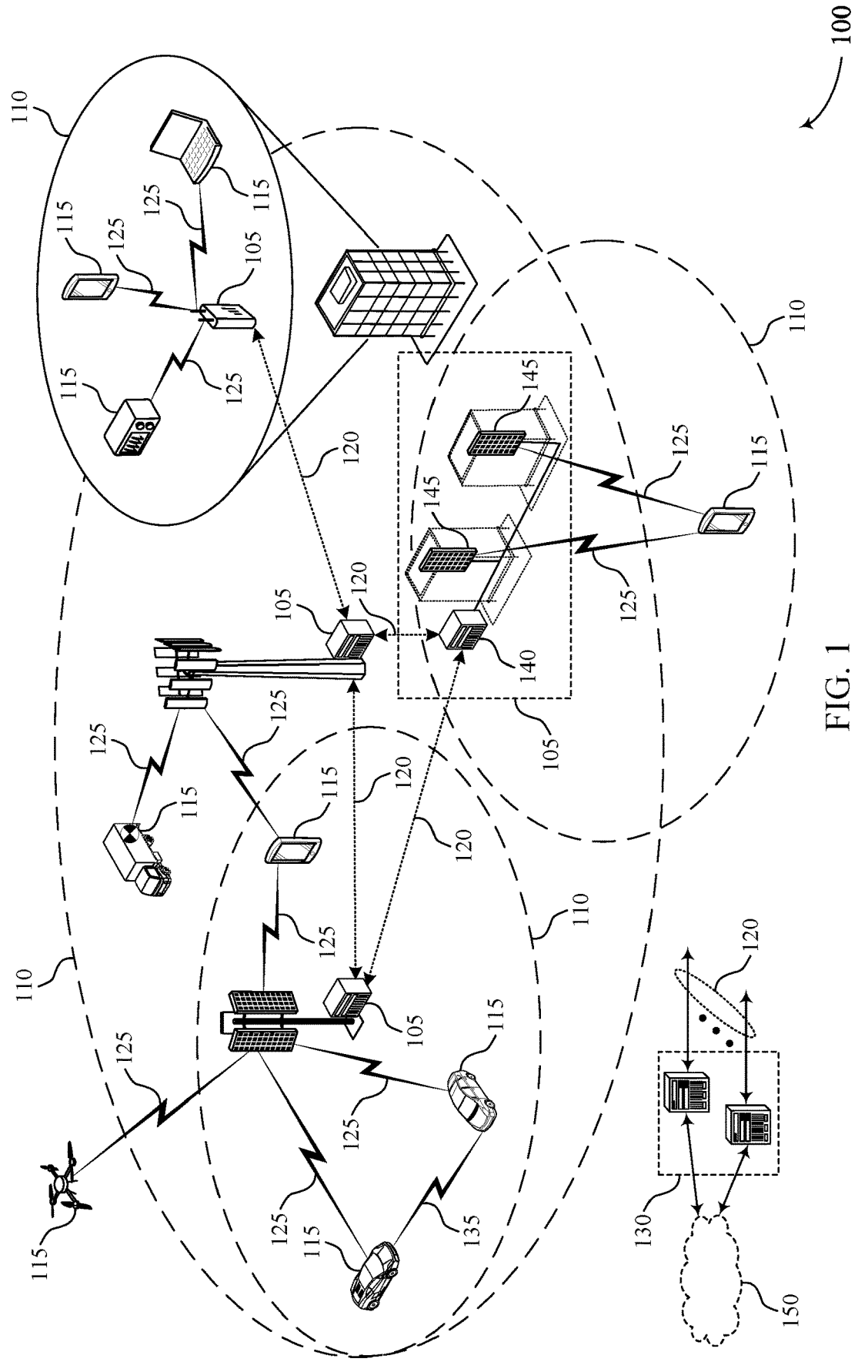
FIGS. 1 and 2 illustrate examples of wireless communications systems that supports techniques for mapping sounding reference signal (SRS) resources in accordance with aspects of the present disclosure.

In some wireless communications systems, a user equipment (UE) may transmit a sounding reference signal (SRS) during at least one SRS resource to a base station, such that the base station may determine one or more channel conditions at the UE (e.g., for scheduling of uplink transmissions). In some examples, the base station may configure the UE with multiple SRS resources in an aperiodic, a semi-persistent, or a periodic configuration, which may be grouped into a resource set based on a use case (e.g., grouped for antenna switching, based on a codebook or not based on a codebook, for beam management, or the like). For example, the UE may perform an SRS antenna switching operation to enable downlink beamforming in time division duplexed (TDD) bands by using channel reciprocity (e.g., the channel responses may be the same in both directions). Further, SRS antenna switching may be used for uplink sounding (e.g., for physical uplink shared channel scheduling and/or beamforming) During the antenna switching operation, the base station may configure the UE with multiple resource sets. In some other examples, such as for a transmission based on a codebook, the base station may configure the UE with a single resource set. It may be beneficial for the UE to merge the usage of the downlink channel state information (CSI) acquisition during the antenna switching operation and the uplink codebook selection to reduce signaling overhead relate to SRS transmissions. However, the antenna switching operation and the transmission based on the codebook may use a different number of resource sets (e.g., one vs. two).

As described herein, a base station may configure a UE with a mapping between SRS resources and SRI bit sequences, and the UE may transmit an SRS during the SRS resource based on receiving an indication of a particular bit sequence. A UE may have a number of transmit antennas, x, and receive antennas, y, for an antenna switching operation. Additionally, the UE may have a number of ports supported for uplink transmissions. In some examples, the UE may transmit a capability message for merging the resource sets for the antenna switching operation and a transmission based on a codebook if x is less than or equal toy. The capability message may include an indication of x, y, and the number of ports supported for uplink transmissions. The base station may transmit control signaling based on the capability message that includes an SRS configuration for SRS resources and bit sequences that maps to the SRS resources based on the SRS configuration. For example, the UE may receive an identifier for each resource set in which the SRS resources are included. The UE may use a default resource set based on the resource set with the smallest identifier. The UE may use an SRS resource index (SRI), which may be a single bit sequence, included in the control signaling to select an SRS resource from the resource set with the smallest identifier for transmitting an SRS. Additionally or alternatively, the UE may receive a separate indication of the resource set identifier for the resource set including the SRS resource indicated by the SRI (e.g., rather than using a default resource set). In some examples, the SRI may be a three bit indicator that the UE may map to an SRS resource in a single resource set or multiple resource sets. In some cases, the control signaling may include an indication for the UE to use a static virtual resource set, which may include one or more fixed, or static, SRS resources from different resource sets. In some other cases, the control signaling may include an indication for the UE to use a dynamic virtual resource set, which may be based on a slot index. The UE may use an SRI included in the control signaling to choose a resource from the static virtual resource set or the dynamic virtual resource set.

Aspects of the disclosure are initially described in the context of wireless communications systems. Aspects of the disclosure are further described in the context of resource diagrams and a process flow. Aspects of the disclosure are further illustrated by and described with reference to apparatus diagrams, system diagrams, and flowcharts that relate to techniques for mapping SRS resources.

FIG. 1 illustrates an example of a wireless communications system 100 that supports techniques for mapping SRS resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may use one or more SRS resources to transmit an SRS to a base station 105. The base station 105 may configure the UE 115 with multiple SRS resources, which may be grouped into resource sets, also referred to as resource sets, depending on the use case or usage type (e.g., antenna switching, codebook-based, non-codebook-based, beam management). The base station 105 may configure the UE 115 with one or more resource sets. Each resource set may contain a set of SRS resources over which the UE 115 may transmit an SRS. In some cases, the UE 115 may be configured to use (e.g., may be physically present at the UE 115 or enabled) a number of transmit antennas as well as a number of receive antennas. The UE 115 may perform SRS antenna switching, which may involve the UE 115 transmitting one or more SRSs to the base station 105 over the transmit antennas and the base station 105 exploiting channel reciprocity to perform downlink beamforming for a time division duplexed (TDD) channel. Resource sets whose resources are used for antenna switching may be said to have an antenna switching usage type. For codebook-based transmissions, the UE 115 may be configured with a single resource set with usage type set to 'codebook.' The base station 105 may include an SRI in a control message to indicate an SRS resource within the configured resource set, where the SRI may have one or more bits. The UE 115 may transmit an SRS to the base station 105 for codebook-based SRS communications.

In some cases, each resource set may map to mutually exclusive SRS resources. For example, resource sets associated with an antenna switching usage type (e.g., configured with usage type set to antenna switching, referred to as antenna switching resource sets) may have resources that differ from resource sets with a codebook usage type (e.g., configured with usage type set to codebook, referred to as codebook resource sets). Codebook resource sets may be merged with antenna switching resource sets. Merging the resource sets (e.g., usage of downlink channel state information (CSI) acquisition and uplink codebook selection) may decrease a number of configurations for SRS transmissions or a total number of resources used for transmitting SRSs, which may enable the base station 105 to more flexibly schedule resources for other types of transmissions or transmissions from other UEs 115. However, the antenna switching operation and the transmission based on the codebook may use a different number of resource sets (e.g., one vs. two), which may cause high signaling overhead due to a lack of configuration when two resource sets are present for a codebook-based SRS transmission.

In some examples, a base station 105 may configure a UE 115 with a mapping between SRS resources and bit sequences, and the UE 115 may transmit an SRS (e.g., a codebook-based SRS or an antenna switching SRS) during the SRS resource based on receiving an indication of a particular bit sequence. For example, the UE 115 may merge one or more resource sets for a codebook-based SRS and an antenna switching based SRS (e.g., one resource set for a codebook-based SRS and one or more resource sets for antenna switching), which is described in further detail with respect to FIG. 3. In some cases, the UE 115 may use one or more SRIs included in a control message from the base station 105 to select respective SRS resources from a default resource set (e.g., the resource set with a smallest identifier), which is described in further detail with respect to FIG. 4. In some other cases, the base station 105 may include an SRS set indicator in the control message in addition to the one or more SRIs, which is described in further detail with respect to FIG. 5. In some examples, the base station 105 may build a lookup table to map the one or more SRIs in the control message to each SRS resource (e.g., based on a bit sequence) in one resource set, which is described in further detail with respect to FIG. 6, or multiple resource sets, which is described in further detail with respect to FIG. 7. In some other examples, the UE 115 may use the one or more SRIs in the control message to select SRS resources from a static virtual resource set, which may be indicated in control signaling as described in further detail with respect to FIG. 8, or a dynamic virtual set, which may be based on a slot index as described in further detail with respect to FIG. 9. Once the UE 115 selects one or more SRS resources, the UE 115 may transmit one or more SRSs in the SRS resources. The techniques described herein may merge the usage of downlink CSI acquisition and uplink codebook selection to reduce SRS overhead.

Figure 2:
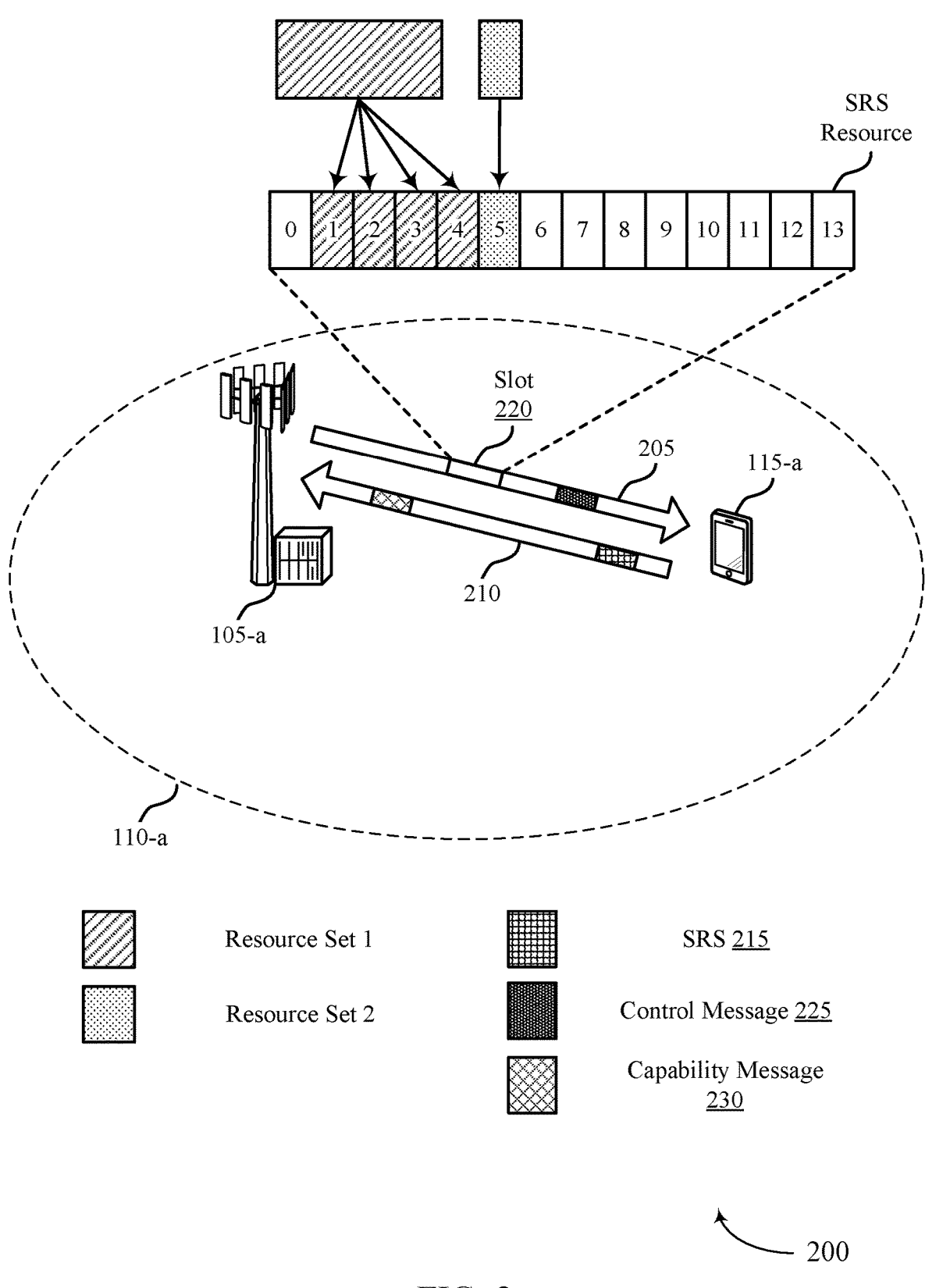

FIG. 2 illustrates an example of a wireless communications system 200 that supports techniques for mapping SRS resources in accordance with aspects of the present disclosure. In some examples, wireless communications system 200 may implement aspects of wireless communication system 100 and may include UE 115-*a* and base station 105-*a* with coverage area 110-*a*, which may be examples of a UE 115 and a base station 105 with a coverage area 110 as described with reference to FIG. 1. In some examples, UE 115-*a* may communicate with base station 105-*a* by receiving control signaling or data via downlink communication link 205, transmitting control signaling or data via uplink communication link 210, or both. For example, base station 105-*a* may configure UE 115-*a* with a mapping between SRS resources and bit sequences, which may be referred to as SRIs, and UE 115-*a* may transmit an SRS 215 during the SRS resource based on receiving an indication of a particular bit sequence.

A UE 115 may use one or more SRS resources to transmit an SRS to a base station 105. For example, UE 115-*a* may use any of SRS resource 1 through SRS resource 13 to transmit an SRS to base station 105-*a*. The SRS resources may be anywhere within a slot 220, such as any of symbol periods 1 to 13 of a slot. The base station 105 may configure the UE 115 with multiple SRS resources, which may be grouped into resource sets, also referred to as SRS resource sets, depending on the use case or usage type (e.g., antenna switching, codebook-based, non-codebook-based, beam management). The base station 105 may configure the UE 115 with one or more resource sets. For example, base station 105-*a* may transmit a control message 225 to UE 115-*a* indicating the one or more resource sets. Base station 105-*a* may transmit the control message 225 via RRC signaling or a downlink control information (DCI) message. Base station 105-*a* may transmit the one or more resource sets aperiodically, semi-persistently, or periodically to UE 115-*a*.

Each resource set may contain a set of SRS resources over which UE 115-*a* may transmit an SRS, such as resource set 1 (e.g., including SRS resource 1 through SRS resource 4) and resource set 2 (e.g., including SRS resource 5). UE 115-*a* and base station 105-*a* may support SRS resources that span 1, 2, 4, 8, or 12 adjacent symbols with up to a predefined number of ports (e.g., 8) per SRS resource. Up to a predefined number of resource sets (e.g., 2 resource sets) may be configured for SRS sounding with antenna switching. Each port of an SRS resource may be sounded in each symbol. In some cases, UE 115-*a* may transmit an SRS in the last 6 symbols of a slot, which may be the last 6 SRS resources in a slot (e.g., SRS resources 8 through 13), and may do so after transmitting a physical uplink shared channel (PUSCH) transmission in that slot. The SRS transmitted over an SRS resource may be a wideband SRS or a subband SRS, where a bandwidth of each SRS may be a multiple of 4 physical resource blocks (PRBs).

In some cases, UE 115-*a* may be configured to use (e.g., may be physically present at the UE 115 or enabled) a number of transmit antennas as well as a number of receive antennas. UE 115-*a* may use up to the number of transmit antennas to transmit signals and may use up to the number of receive antennas to receive signals. In some cases, the number of transmit antennas versus the number of receive antennas may be given by xTyR, where x may be equal to the number of transmit antennas and y may be equal to the number of receive antennas. For instance, 1T1R may correspond to UE 115-*a* having or being configured to use 1 transmit antenna and 1 receive antenna.

UE 115-*a* may perform SRS antenna switching, which may involve UE 115-*a* transmitting one or more SRSs to base station 105-*a* over the transmit antennas, and base station 105-*a* exploiting channel reciprocity to perform downlink beamforming for a time division duplexed (TDD) channel. For example, base station 105-*a* may receive the SRS, may perform uplink channel estimation, and may exploit channel reciprocity to determine a downlink channel estimation from the uplink channel estimation. Base station 105-a may use the downlink channel estimation for downlink beamforming. Additionally or alternatively, UE 115-a may perform SRS antenna switching for uplink sounding (e.g., for PUSCH scheduling or PUSCH beamforming). resource sets whose resources are used for antenna switching may be said to have an antenna switching usage type. Generally, SRS antenna switching may be supported if the number of transmit x≤y for xTyR (e.g., 1T2R, 2T4R, 1T4R, 1T4R/2T4R, or T=R). The number of SRS resources in a resource set for antenna switching may be given by x/y. For example, an antenna switching resource set for a UE 115 configured with 1T4R may have four SRS resources.

For codebook-based transmissions, UE 115-a may be configured with a single resource set (e.g., SRS-Resource-Set) with usage type set to 'codebook.' Base station 105-a may include an SRI in the control message 225 to indicate an SRS resource within the configured resource set (e.g., a single SRS resource), where the SRI may have one or more bits. In some examples, a defined (e.g., maximum) number of configured SRS resources for codebook-based transmission may have a predefined value (e.g., 4) (e.g., when a higher layer parameter, such as ul-FullPowerTransmission, is set to full power mode). Performing codebook-based SRS communications may involve UE 115-a transmitting an SRS to base station 105-a to be used for uplink sounding. Based on measurements on the configured SRS, base station 105-a may sound the channel and may determine a suitable rank and precoder matrix. Determining the rank and precoder matrix may enable base station 105-a to perform PUSCH scheduling, beamforming, or both to receive a PUSCH transmission. When performing codebook-based SRS communications, UE 115-a may be configured for transmission of at least one multi-port SRS, where a 1-bit or 2-bit SRS resource indicator (SRI) indicates on the configured SRS. In some cases, UE 115-a may utilize multiple SRS beams, where each SRS beam may correspond to a different device antenna panel with different directions, and where each panel may include a set of antenna elements corresponding to antenna ports of each multi-port SRS. Resource sets whose resources are used for codebook-based SRS communications may be said to have a codebook usage type.

In some cases, each resource set may map to mutually exclusive SRS resources. For example, resource sets associated with an antenna switching usage type (e.g., configured with usage type set to antenna switching, referred to as antenna switching resource sets) may have resources that differ from resource sets with a codebook usage type (e.g., configured with usage type set to codebook, referred to as codebook resource sets). Codebook resource sets may be merged with antenna switching resource sets. Merging the resource sets (e.g., usage of downlink channel state information (CSI) acquisition and uplink codebook selection) may decrease a number of configurations for SRS transmissions or a total number of resources used for transmitting SRSs, which may enable base station 105-a to more flexibly schedule resources for other types of transmissions or transmissions from other UEs 115. However, the antenna switching operation and the transmission based on the codebook may use a different number of resource sets (e.g., one vs. two), which may cause high signaling overhead due to a lack of configuration when two resource sets are present for a codebook-based SRS transmission.

In some examples, a base station 105 may configure a UE 115 with a mapping between SRS resources and bit sequences, and the UE 115 may transmit an SRS (e.g., a codebook-based SRS or an antenna switching SRS) during the SRS resource based on receiving an indication of a particular bit sequence. For example, UE 115-a may merge one or more resource sets for a codebook-based SRS and an antenna switching based SRS (e.g., one resource set for a codebook-based SRS and one or more resource sets for antenna switching), which is described in further detail with respect to FIG. 3. In some cases, the resource set for a codebook-based SRS may have one SRS resource with a number of ports, such as resource set 1. In some other cases, the antenna switching operation may use multiple resources (e.g., the number of resources, $$R = \frac{y}{x}).$$

The multiple resources may be grouped into one or more resource sets having $N_s$ resources, each resource having a number of ports. For example, UE 115-a may use S sets for an antenna switching operation (e.g., S>1, set>1, set 1, set 2, . . . , set S). Thus, the number of resources may satisfy the summation, $$R = \sum_{S=1}^{S} N_s.$$

In some examples, UE 115-a may transmit a capability message 230 to base station 105-a. The capability message may indicate x, y, the number of ports supported for uplink transmissions at UE 115-a, or a combination. UE 115-a may transmit the capability message 230 to base station 105-a if y is greater than x, (x<y). In some cases, base station 105-a may transmit the control message 225 in response to receiving the capability message 230 from UE 115-a. Base station 105-a may include an SRI in the control message 225 to indicate to UE 115-a which SRS resource in a resource set to use for a codebook-based SRS transmission (e.g., with which resource a transmission precoding matrix indication (TPMI) is associated). Additionally or alternatively, base station 105-a may build a lookup table, and configure the UE 115-a with the lookup table, that maps an SRI (e.g., included in the control message 225) to an SRS resource.

Figure 4:
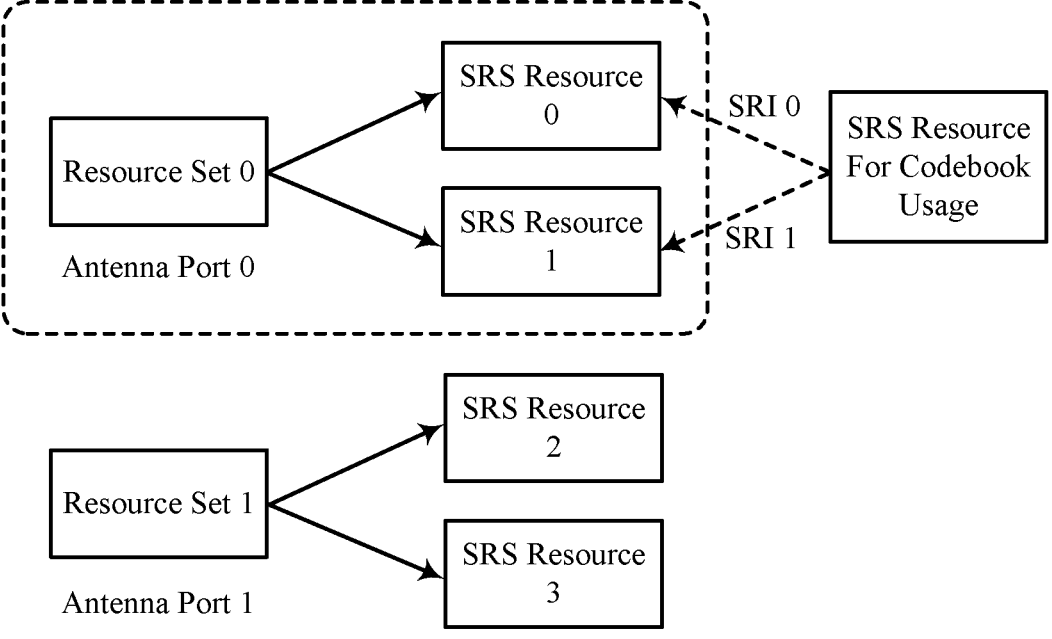

In some cases, UE 115-a may use one or more SRIs included in the control message 225 to select respective SRS resources from a default resource set (e.g., the resource set with a smallest identifier), which is described in further detail with respect to FIG. 4. In some other cases, base station 105-a may include an SRS set indicator in the control message 225 in addition to the one or more SRIs, which is described in further detail with respect to FIG. 5. In some examples, base station 105-a may build a lookup table to map the one or more SRIs in the control message 225 to each SRS resource (e.g., based on a bit sequence) in one resource set, which is described in further detail with respect to FIG. 6, or multiple resource sets, which is described in further detail with respect to FIG. 7. In some other examples, UE 115-a may use the one or more SRIs in the control message 225 to select SRS resources from a static virtual resource set, which may be indicated in control signaling as described in further detail with respect to FIG. 8, or a dynamic virtual set, which may be based on a slot index as described in further detail with respect to FIG. 9. Once UE 115-a selects one or more SRS resources, UE 115-a may transmit one or more SRSs in the SRS resources.

Figure 3:
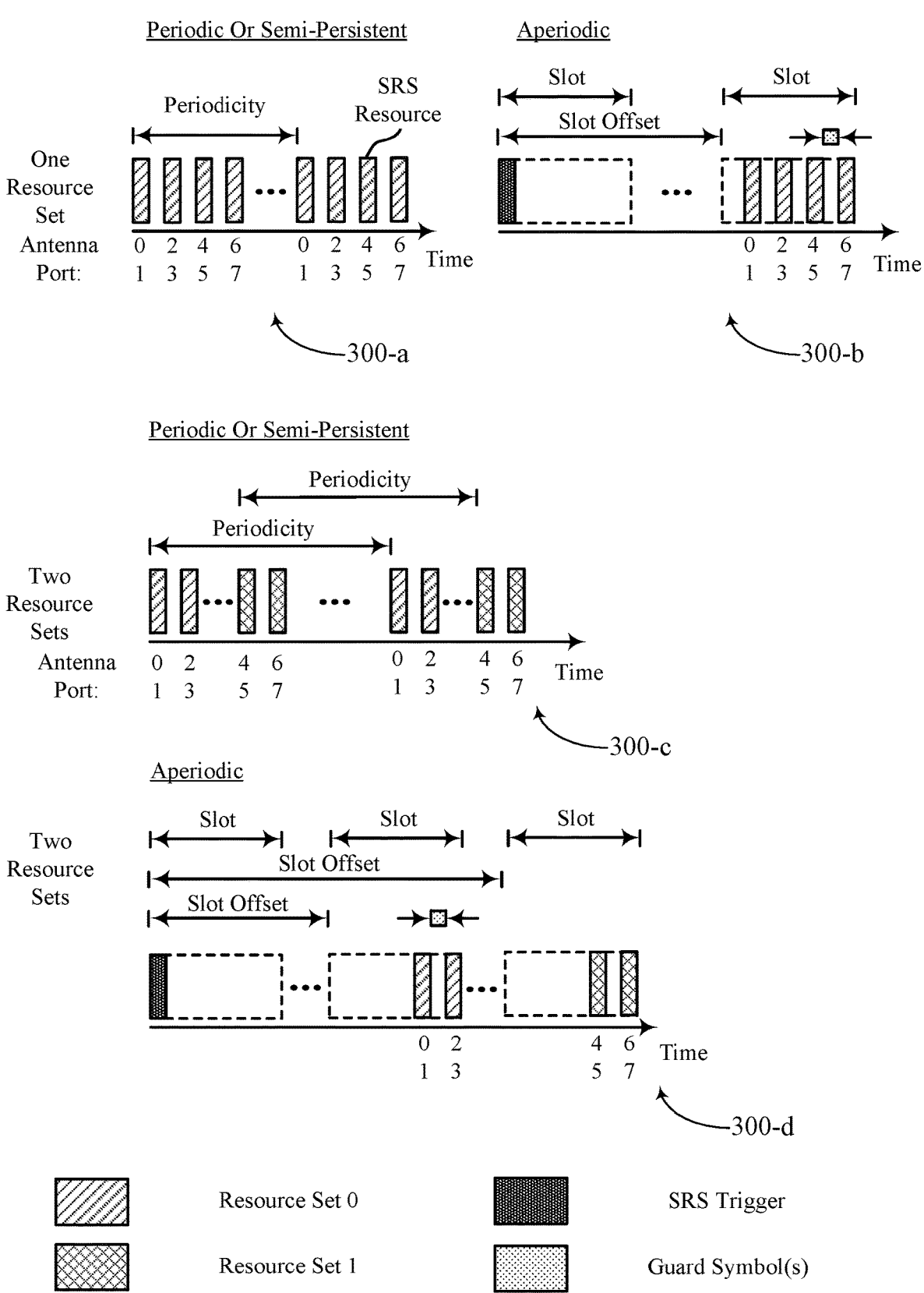
FIGS. 3 through 9 illustrate examples of resource diagrams that supports techniques for mapping SRS resources in accordance with aspects of the present disclosure.

FIG. 3 illustrates an example of resource diagrams 300 that supports techniques for mapping SRS resources in accordance with aspects of the present disclosure. In some examples, resource diagrams 300 may implement aspects of wireless communications system 100, wireless communications system 200, or both. Resource diagrams 300 may be implemented by a UE 115 and a base station 105 in an SRS transmission (e.g., merged codebook-based SRS transmission and one or more antenna switching SRS transmissions), as described with reference to FIGS. 1 and 2. For example, resource diagram 300-*a* may illustrate an SRS resource configuration for a periodic or semi-persistent transmission of an resource set with four SRS resources per resource set. Resource diagram 300-*b* may illustrate an SRS resource configuration for an aperiodic transmission of an resource set with four SRS resources per resource set. Resource diagram 300-*c* may illustrate an SRS resource configuration for a periodic or semi-persistent transmission of two resource sets with two SRS resources per resource set. Resource diagram 300-*d* may illustrate an SRS resource configuration for an aperiodic transmission of two resource sets with two SRS resources per resource set. Although combinations with one or two resource sets and four or two SRS resources per set, respectively, are illustrated in resource diagrams 300, a UE 115 as described with reference to FIGS. 1 and 2 may support any other number of SRS resources and resource sets.

In some cases, a UE 115 may use one or more resource sets for an antenna switching operation, while the UE 115 may use one resource set for a codebook-based SRS transmission. Further, the UE 115 may use multiple SRS resources from the one or more resource sets for the antenna switching operation, while the UE 115 may use one SRS resource from the one resource set for the codebook-based SRS transmission. The UE 115 may have a number of transmit antennas, x, and a number of receive antennas, y, such as four, six, or eight receive antennas (e.g., two transmit antennas (e.g., x=2) and eight receive antennas (e.g., y=8) as illustrated for resource diagrams 300).

In some examples, such as for resource diagram 300-*a* through 300-d, the UE 115 may use two antenna ports for each SRS resource. In resource diagram 300-*a*, the UE 115 may use two antenna ports for each of the four SRS resources in the resource set 0, which may be transmitted periodically or semi-persistently based on a periodicity. Similarly, in resource diagram 300-*b*, the UE 115 may use two antenna ports for each of the four SRS resources in the resource set 0, which may be transmitted aperiodically (e.g., in response to receiving an SRS trigger) during a slot based on a slot offset and a guard period, such as a number of symbols, between each SRS resource. In resource diagram 300-*c*, the UE 115 may use two antenna ports for each of the two SRS resources in the resource set 0 and the resource set 1, which may be transmitted periodically or semi-persistently based on a periodicity. Similarly, in resource diagram 300-*d*, the UE 115 may use two antenna ports for each of the two SRS resources in the resource set 0 and the resource set 1, which may be transmitted aperiodically during a slot based on a slot offset and a guard period between each SRS resource.

In some examples, such as for an SRS usage merge, the SRI field in a control message from a base station 105 to the UE 115 may be enhanced to support a relatively greater number of SRS resource candidates for codebook usage (e.g., six or eight receive antennas and eight SRS resource candidates for one transmit antenna). For example, the SRI field may include a number of bits that support an indication for each SRS resource in an resource set.

FIG. 4 illustrates an example of a resource diagram 400 that supports techniques for mapping SRS resources in accordance with aspects of the present disclosure. In some examples, resource diagram 400 may implement aspects of wireless communications system 100, wireless communications system 200, resource diagrams 300, or a combination. Resource diagram 400 may be implemented by a UE 115 and a base station 105 in an SRS transmission (e.g., merged codebook-based SRS transmission and one or more antenna switching SRS transmissions), as described with reference to FIGS. 1 and 2. For example, resource diagram 400 may illustrate a process in which a UE 115 may use one or more SRIs included in a control message to select respective SRS resources from a default resource set (e.g., the resource set with a smallest identifier).

In some cases, a base station 105 may transmit an SRS configuration indicating one or more resource sets (e.g., Resource Set 0, Resource Set 1, or both), one or more SRS resources corresponding to each resource set (e.g., Resource Set 0 corresponding to SRS Resources 0 and 1, and Resource Set 1 corresponding to SRS Resources 2 and 3), wherein the SRS configurations indicates a mapping between each SRS resource and a bit sequence. In some cases, as illustrated in resource diagram 400, the SRS configuration may configure the UE 115 to select a default resource set, such as Resource Set 0, which may be the resource set with a lowest or highest identifier. The base station 105 may transmit a control message (e.g., via a DCI message) to a UE 115 including a bit sequence, which may be referred to as an SRI, to indicate an SRS resource based on the mapping. For example, an SRI value of 0 may indicate SRS Resource 0 in the default resource set, while an SRI value of 1 may indicate SRS Resource 1 in the default resource set. The UE 115 may select an SRS resource for codebook usage based on the SRI and a resource set based on the mapping.

In some examples, the control message may include one or more identifiers for respective resource sets. The UE 115 may select a default resource set (e.g., the resource set with the smallest identifier) from the multiple resource sets indicated by the sounding reference signal configuration. In the depicted example, the default resource set may be Resource Set 0. The UE 115 may use one or more SRIs included in the control message to select respective SRS resources for transmitting an SRS transmission (e.g., codebook usage). The UE 115 may use one or more other SRS resources for an antenna switching operation (e.g., downlink CSI usage).

For example, resource diagram 400 may illustrate an example process when the UE 115 has two transmit antennas and eight receive antennas, and is configured with two resource sets with two SRS resources in each set, where one of the SRS resources is for codebook usage, and the SRI field is a single bit. Each resource set may be associated with an antenna port. For example, Resource Set 0 may use Antenna Port 0, while Resource Set 1 may use Antenna Port 1. The UE 115 may use one SRS resource for codebook usage based on a one bit indicator (e.g., an SRI of 0 or an SRI of 1). For example, the control message may be a DCI message with an SRI field, where the SRI field having a value of 0 indicates SRS Resource 0 of the default Resource Set, and the SRI field having a value of 1 indicates SRS Resource 1 of the default Resource Set. The UE 115 may transmit an SRS in the SRS resource indicated by the SRI field in the control message.

Figure 5:
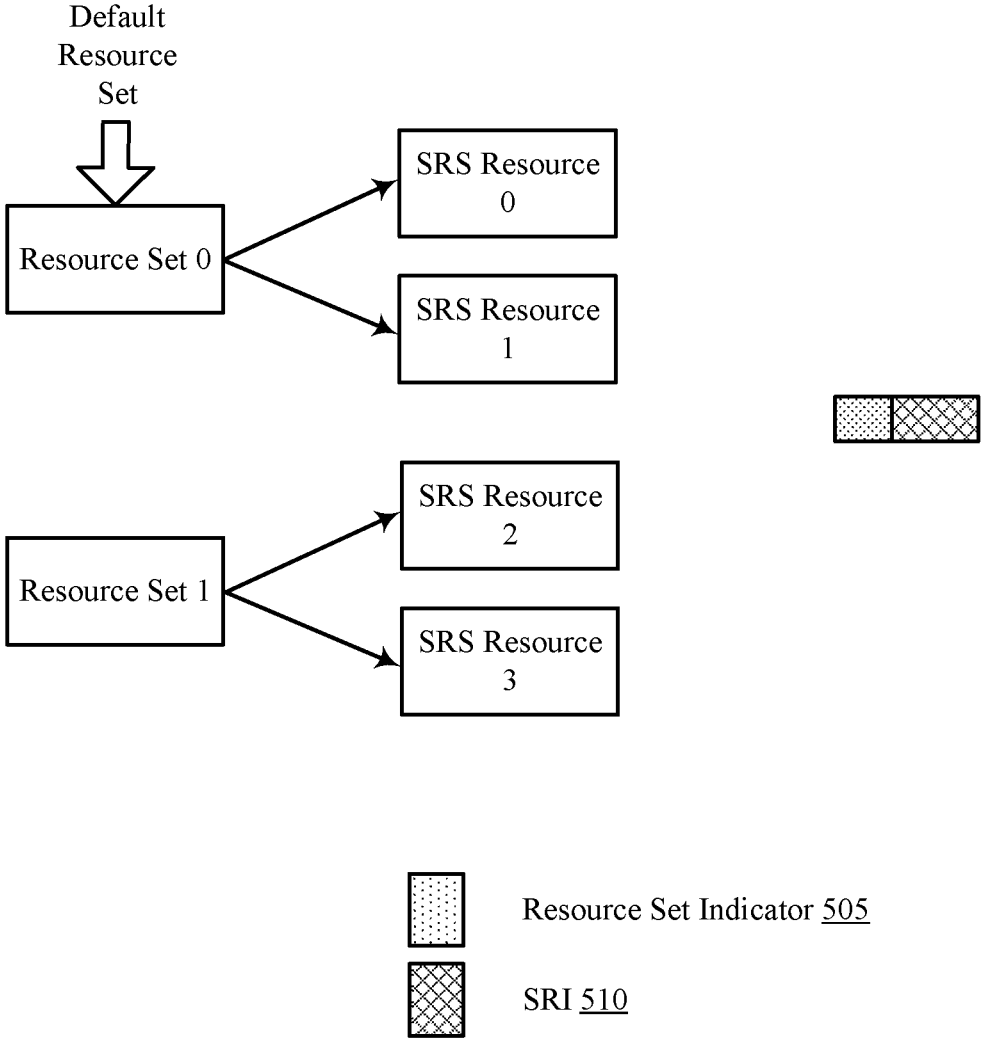

FIG. 5 illustrates an example of a resource diagram 500 that supports techniques for mapping SRS resources in accordance with aspects of the present disclosure. In some examples, resource diagram 500 may implement aspects of wireless communications system 100, wireless communications system 200, resource diagrams 300, resource diagram 400, or a combination. Resource diagram 500 may be implemented by a UE 115 and a base station 105 in an SRS transmission (e.g., merged codebook-based SRS transmission and one or more antenna switching SRS transmissions), as described with reference to FIGS. 1 and 2. For example, resource diagram 500 may illustrate a process in which a base station 105 may include an SRS set indicator and one or more SRIs in a control message to a UE 115.

In some cases, a base station 105 may transmit an SRS configuration indicating one or more resource sets (e.g., Resource Set 0, Resource Set 1, or both), one or more SRS resources corresponding to each resource set (e.g., Resource Set 0 corresponding to SRS Resources 0 and 1, and Resource Set 1 corresponding to SRS Resources 2 and 3), wherein the SRS configuration indicates a mapping between each SRS resource and a bit sequence. In some cases, as illustrated in resource diagram 500, the UE 115 may select a resource set, such as Resource Set 0 or Resource Set 1, based on a resource set indicator 505 in the SRS configuration. The base station 105 may transmit a control message (e.g., via a DCI message) to a UE 115 including a bit sequence, which may be referred to as an SRI, to indicate an SRS resource based on the mapping. For example, an SRI value of 0 may indicate SRS Resource 0 in the indicated resource set, such as Resource Set 0, while an SRI value of 1 may indicate SRS Resource 1 in the indicated resource set. The UE 115 may select an SRS resource for codebook usage based on the SRI and a resource set.

In some examples, the control message may include an indication of a resource set indicator 505 and an SRI 510. The resource set indicator 505 may be one bit with a value of 0 indicating to the UE 115 is to use a default resource set (e.g., the Resource Set with the lowest identifier or highest identifier) and a value of 1 indicating to the UE to use the resource set 1. The SRI 510 may be any number of bits with a value of 0 indicating to the UE to use the first SRS resource within the default resource set (e.g., SRS resource 0) and a bit value greater than 0 indicating the SRS resource within the set (e.g., SRS resource 1 through SRS resource 3). The UE 115 may use one or more SRIs 510 and respective resource set identifiers 505 included in the control message to select SRS resources for transmitting an SRS transmission (e.g., codebook usage). The UE 115 may use one or more other SRS resources for an antenna switching operation (e.g., downlink CSI usage).

For example, resource diagram 500 may illustrate an example process when the UE 115 has two transmit antennas and eight receive antennas, and is configured with two resource sets with two SRS resources in each set, wherein one of the SRS resources is for codebook usage, and the SRI field is a single bit. The UE 115 may use one SRS resource for codebook usage based on a one bit indicator (e.g., an SRI of 0 or an SRI of 1). For example, the control message may be a DCI message with a resource set identifier field and an SRI field, where the resource set indicator 505 having a value of 0 indicates Resource Set 0 and the resource set indicator 505 having a value of 1 indicates Resource set 1. Additionally, the SRI field having a value of 0 indicates SRS Resource 0, the SRI field having a value of 1 indicates SRS Resource 1, the SRI field having a value of 2 indicates SRS Resource 2, and the SRI field having a value of 3 indicates SRS Resource 3. The UE 115 may transmit an SRS in the SRS resource indicated by the SRI field in the control message.

Figure 6:
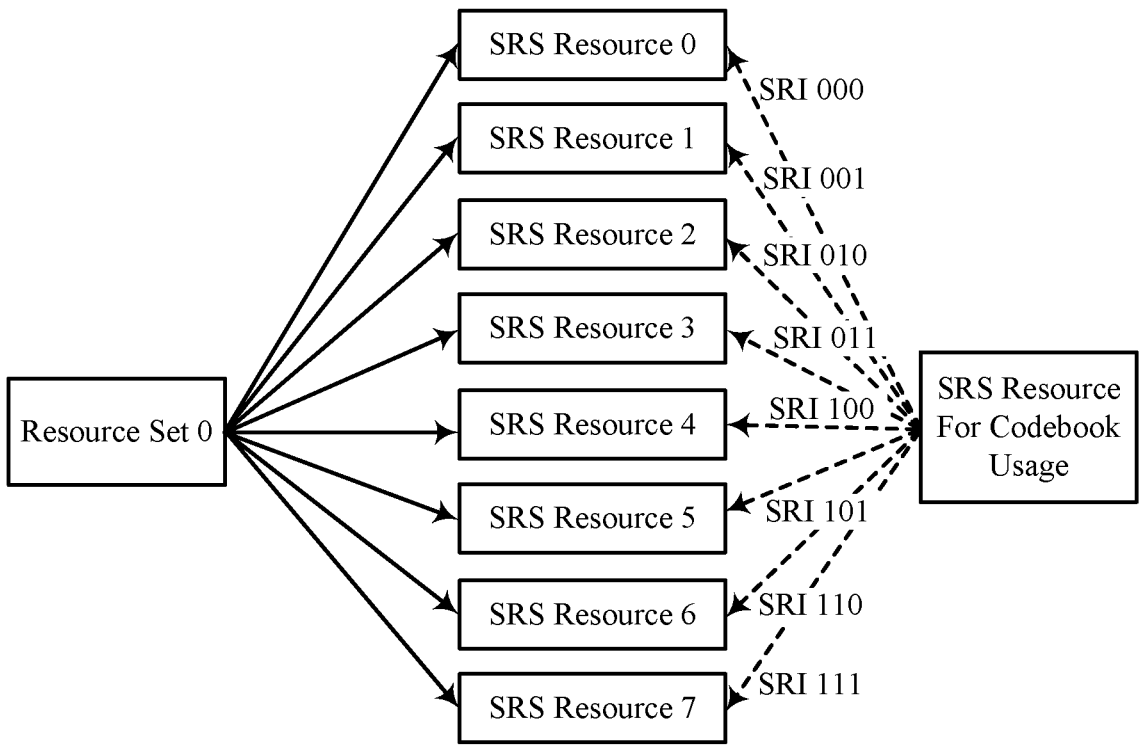

FIG. 6 illustrates an example of a resource diagram 600 that supports techniques for mapping SRS resources in accordance with aspects of the present disclosure. In some examples, resource diagram 600 may implement aspects of wireless communications system 100, wireless communications system 200, resource diagrams 300, resource diagram 400, resource diagram 500, or a combination. Resource diagram 600 may be implemented by a UE 115 and a base station 105 in an SRS transmission (e.g., merged codebook-based SRS transmission and one or more antenna switching SRS transmissions), as described with reference to FIGS. 1 and 2. For example, resource diagram 600 may illustrate a process in which a base station 105 may build a lookup table to map one or more SRIs to each SRS resource in one resource set based on a bit sequence included in a control message to a UE 115.

In some cases, a base station 105 may transmit an SRS configuration indicating one or more resource sets (e.g., Resource Set 0), one or more SRS resources corresponding to each resource set (e.g., SRS Resource 0 through SRS Resource 7 corresponding to Resource Set 0), where the SRS configuration indicates a mapping between each SRS resource and a bit sequence. In some cases, as illustrated in resource diagram 600, the base station 105 may build a lookup table, then indicate the lookup table to a UE 115 in the SRS configuration. The base station 105 may transmit a control message (e.g., via a DCI message) to the UE 115 including a bit sequence, which may be referred to as an SRI, to indicate an SRS resource based on the mapping. For example, the UE 115 may select one of SRS Resource 0 through SRS Resource 7 if the SRI has a value of 000 through 111, respectively. The UE 115 may select an SRS resource for codebook usage based on the SRI and a resource set.

In some examples, the base station 105 may build a lookup table to map the SRI in the control message to each SRS resource (e.g., regardless of the number of SRS resources in the resource set) in a single resource set, such as resource set 0. For example, the SRI may be a bit sequence with a size of log 2R bits, where R is the number of SRS resources in the resource set. For a UE 115 with one transmit antenna and 8 receive antennas, the UE 115 may select an SRS resource from a single resource set with eight SRS resources based on an SRI of three bits. As illustrated in resource diagram 600, the control message may indicate each of SRS resource 0 through SRS resource 7 with a three bit value. If there were more SRS resources in the resource set, the base station 105 may indicate the SRI to the UE 115 with a bit sequence size greater than three. The UE 115 may use one or more SRIs included in the control message to select SRS resources for transmitting an SRS transmission (e.g., codebook usage). The UE 115 may use one or more other SRS resources for an antenna switching operation (e.g., downlink CSI usage).

For example, resource diagram 600 may illustrate an example process when the UE 115 has one transmit antenna and eight receive antennas, and is configured with one resource set with eight SRS resources, where one of the SRS resources is for codebook usage, and the SRI field is three bits. The UE 115 may use one SRS resource for codebook usage based on a three bit indicator (e.g., an SRI of 000 through an SRI of 111). For example, the control message may be a DCI message with an SRI field, where the SRI field having a value of 000 indicates SRS Resource 0, the SRI field having a value of 001 indicates SRS Resource 1, etc. The UE 115 may transmit an SRS in the SRS resource indicated by the SRI field in the control message.

Figure 7:
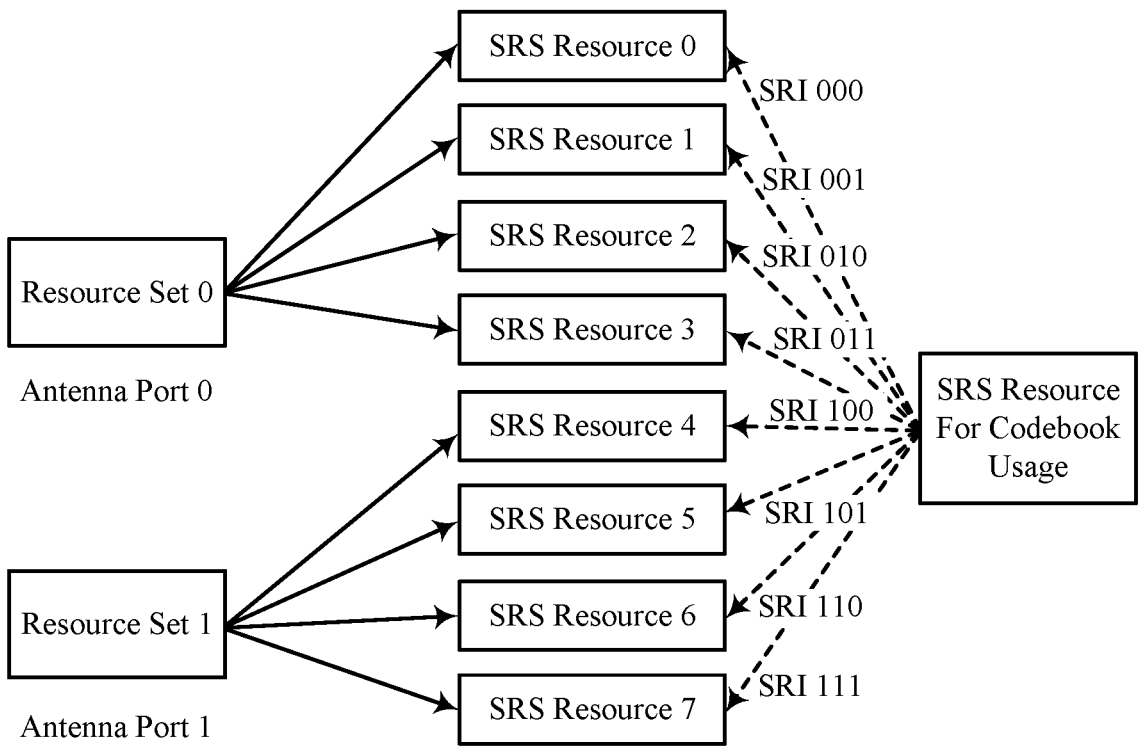

FIG. 7 illustrates an example of a resource diagram 700 that supports techniques for mapping SRS resources in accordance with aspects of the present disclosure. In some examples, resource diagram 700 may implement aspects of wireless communications system 100, wireless communications system 200, resource diagrams 300, resource diagram 400 through resource diagram 600, or a combination. Resource diagram 700 may be implemented by a UE 115 and a base station 105 in an SRS transmission (e.g., merged codebook-based SRS transmission and one or more antenna switching SRS transmissions), as described with reference to FIGS. 1 and 2. For example, resource diagram 700 may illustrate a process in which a base station 105 may build a lookup table to map one or more SRIs to each SRS resource in multiple resource sets based on a bit sequence included in a control message to a UE 115.

In some cases, a base station 105 may transmit an SRS configuration indicating one or more resource sets (e.g., Resource Set 0, Resource Set 1, or both), one or more SRS resources corresponding to each resource set (e.g., SRS Resource 0 through SRS Resource 3 corresponding to Resource Set 0 and SRS Resource 4 through SRS Resource 7 corresponding to Resource Set 1), where the SRS configuration indicates a mapping between each SRS resource and a bit sequence. In some cases, as illustrated in resource diagram 700, the base station 105 may build a lookup table, then indicate the lookup table to a UE 115 in the SRS configuration. The base station 105 may transmit a control message (e.g., via a DCI message) to the UE 115 including a bit sequence, which may be referred to as an SRI, to indicate an SRS resource based on the mapping. For example, the UE 115 may select one of SRS Resource 0 through SRS Resource 7 if the SRI has a value of 000 through 111, respectively. The UE 115 may select an SRS resource for codebook usage based on the SRI and a resource set.

In some examples, the base station 105 may build a lookup table to map the SRI in the control message to each SRS resource (e.g., regardless of the number of SRS resources in the resource set) in multiple resource sets, such as resource set 0 and resource set 1. For example, the SRI may be a bit sequence with a size of log 2R bits, where R is the number of SRS resources in the resource set. For a UE 115 with one transmit antenna and 8 receive antennas, the UE 115 may select an SRS resource from one of the two resource sets with four SRS resources in each based on an SRI of three bits. As illustrated in resource diagram 700, the control message may indicate each of SRS resource 0 through SRS resource 7 with a three bit value. If there were more SRS resources in the resource set, the base station 105 may indicate the SRI to the UE 115 with a bit sequence size greater than three. The UE 115 may use one or more SRIs included in the control message to select SRS resources for transmitting an SRS transmission (e.g., codebook usage). The UE 115 may use one or more other SRS resources for an antenna switching operation (e.g., downlink CSI usage).

For example, resource diagram 700 may illustrate an example process when the UE 115 has one transmit antenna and eight receive antennas, and is configured with two resource sets with four SRS resources each, where one of the SRS resources is for codebook usage, and the SRI field is three bits. Each resource set may be associated with an antenna port. For example, Resource Set 0 may use Antenna Port 0, while Resource Set 1 may use Antenna Port 1. The UE 115 may use one SRS resource for codebook usage based on a three bit indicator (e.g., an SRI of 000 through an SRI of 111) independent of the number of resource sets. For example, the control message may be a DCI message with an SRI field, where the SRI field having a value of 000 indicates SRS Resource 0, the SRI field having a value of 001 indicates SRS Resource 1, etc. The UE 115 may transmit an SRS in the SRS resource indicated by the SRI field in the control message.

Figure 8:
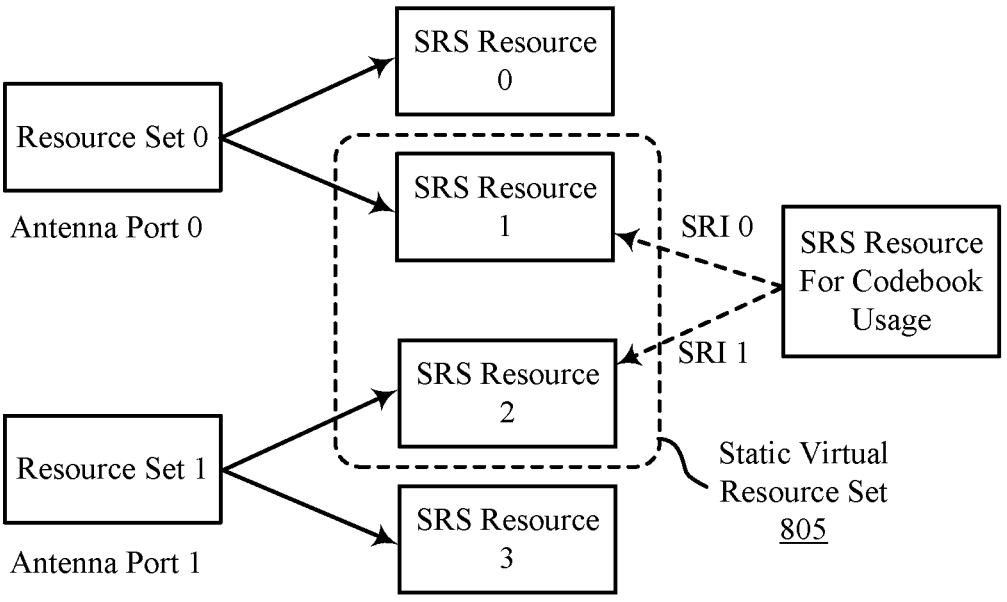
Figure 8:
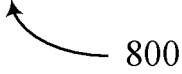

FIG. 8 illustrates an example of a resource diagram 800 that supports techniques for mapping SRS resources in accordance with aspects of the present disclosure. In some examples, resource diagram 800 may implement aspects of wireless communications system 100, wireless communications system 200, resource diagrams 300, resource diagram 400 through resource diagram 700, or a combination. Resource diagram 800 may be implemented by a UE 115 and a base station 105 in an SRS transmission (e.g., merged codebook-based SRS transmission and one or more antenna switching SRS transmissions), as described with reference to FIGS. 1 and 2. For example, resource diagram 800 may illustrate a process in which a UE 115 may use one or more SRIs included in a control message to select SRS resources from a static virtual resource set 805, which may be indicated in control signaling from a base station 105.

In some cases, a base station 105 may transmit an SRS configuration indicating one or more resource sets (e.g., Resource Set 0, Resource Set 1, or both), one or more SRS resources corresponding to each resource set (e.g., SRS Resources 0 and 1 corresponding to Resource Set 0 and SRS Resources 2 and 3 corresponding to Resource Set 1), where the SRS configuration indicates a mapping between each SRS resource and a bit sequence. The UE 115 may perform a static down-selection method to determine a static virtual resource set 805, which may include SRS resources from Resource Set 0 and Resource Set 1 (e.g., SRS Resource 1 from Resource Set 0 and SRS Resource 2 from Resource Set 1). In some cases, as illustrated in resource diagram 800, the UE 115 may down-select SRS Resource 1 from Resource Set 0 and SRS Resource 2 from Resource Set 1 for the static virtual resource set 805, based on control signaling. The base station 105 may transmit a control message (e.g., via a DCI message) to a UE 115 including a bit sequence, which may be referred to as an SRI, to indicate an SRS resource based on the mapping. For example, an SRI value of 0 may indicate SRS Resource 1 in the static virtual resource set 805, while an SRI value of 1 may indicate SRS Resource 2 in the static virtual resource set 805. The UE 115 may select an SRS resource for codebook usage based on the SRI and the static virtual resource set 805.

In some examples, the UE 115 may perform a static down-selection method to reduce the signaling overhead from SRI transmissions. For example, the UE 115 may use a static virtual resource set 805 (e.g., which may be preset) including a portion of the total SRS resources available to the UE 115, such as SRS resource 1 and SRS resource 2, based on control signaling. That is, in some cases, the UE 115 may receive an SRS configuration from the base station 105 (e.g., via RRC signaling or a MAC-CE), and may use the SRS configuration to down-select the static virtual resource set 805. The UE 115 may use an SRI included in the control message received from the base station 105 to select an SRS resource from the static virtual resource set 805. Resource diagram 800 may illustrate an example process when the UE 115 has two transmit antennas and eight receive antennas, and receives two resource sets with two SRS resources in each set. The SRI may be one bit with a value of 0 to indicate SRS resource 1 or a value of 1 to indicate SRS resource 2 of the static virtual resource set 805. The UE 115 may use one or more SRIs included in the control message to select SRS resources from the static virtual resource set 805 for transmitting an SRS transmission (e.g., codebook usage). The UE 115 may use one or more other SRS resources for an antenna switching operation (e.g., downlink CSI usage).

For example, resource diagram 800 may illustrate an example process when the UE 115 is configured with a static virtual resource set 805 including two SRS resources (e.g., SRS Resource 1 from Resource Set 0 and SRS Resource 2 from Resource Set 1), each from different resource sets with two SRS resources in each set. In some cases, one of the SRS resources in the static virtual resource set 805 is for codebook usage, and the SRI field may be a single bit. Each resource set may be associated with an antenna port. For example, Resource Set 0 may use Antenna Port 0, while Resource Set 1 may use Antenna Port 1. The UE 115 may use one SRS resource for codebook usage based on a one bit indicator (e.g., an SRI of 0 or an SRI of 1). For example, the control message may be a DCI message with an SRI field, where the SRI field having a value of 0 indicates SRS Resource 1, and the SRI field having a value of 1 indicates SRS Resource 2. The UE 115 may transmit an SRS in the SRS resource indicated by the SRI field in the control message.

Figure 9:
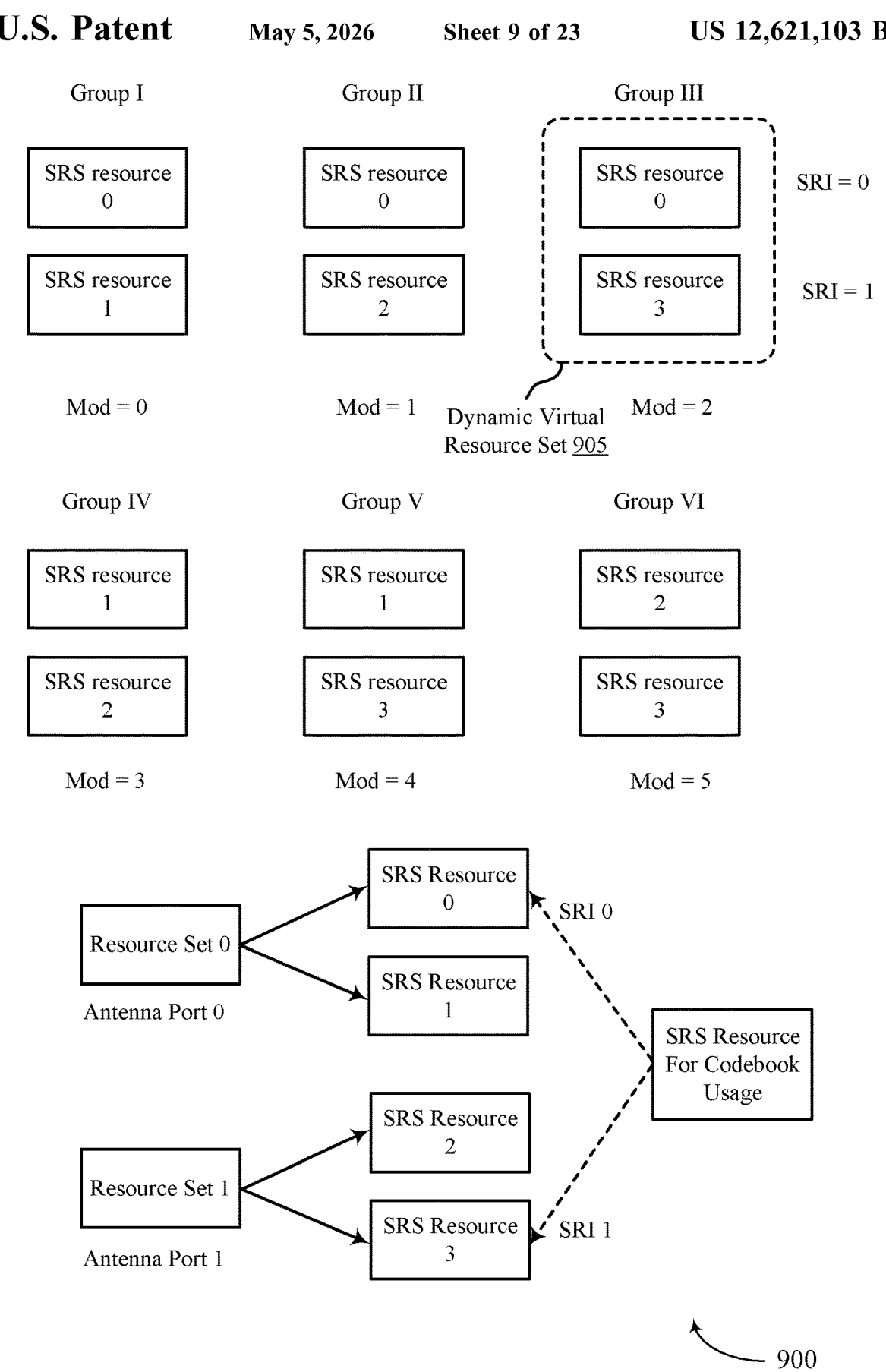

FIG. 9 illustrates an example of a resource diagram 900 that supports techniques for mapping SRS resources in accordance with aspects of the present disclosure. In some examples, resource diagram 900 may implement aspects of wireless communications system 100, wireless communications system 200, resource diagrams 300, resource diagram 400 through resource diagram 800, or a combination. Resource diagram 900 may be implemented by a UE 115 and a base station 105 in an SRS transmission (e.g., merged codebook-based SRS transmission and one or more antenna switching SRS transmissions), as described with reference to FIGS. 1 and 2. For example, resource diagram 900 may illustrate a process in which a UE 115 may use one or more SRIs included in a control message to select SRS resources from a dynamic virtual resource set based on a slot index.

In some cases, a base station 105 may transmit an SRS configuration indicating one or more resource sets (e.g., Resource Set 0, Resource Set 1, or both), one or more SRS resources corresponding to each resource set (e.g., SRS Resources 0 and 1 corresponding to Resource Set 0 and SRS Resources 2 and 3 corresponding to Resource Set 1), where the SRS configuration indicates a mapping between each SRS resource and a bit sequence. The UE 115 may perform a cycled down-selection method to determine a dynamic virtual resource set 905, which may include SRS resources from Resource Set 0, Resource Set 1, or both (e.g., SRS Resource 0 from Resource Set 0 and SRS Resource 3 from Resource Set 1). In some cases, as illustrated in resource diagram 900, the UE 115 may down-select SRS Resource 0 from Resource Set 0 and SRS Resource 3 from Resource Set 1 for the dynamic virtual resource set 905 based on a slot index. The base station 105 may transmit a control message (e.g., via a DCI message) to a UE 115 including a bit sequence, which may be referred to as an SRI, to indicate an SRS resource based on the mapping. For example, an SRI value of 0 may indicate SRS Resource 0 in the dynamic virtual resource set 905, while an SRI value of 1 may indicate SRS Resource 3 in the dynamic virtual resource set

905. The UE 115 may select an SRS resource for codebook usage based on the SRI and the dynamic virtual resource set 905.

In some examples, the UE 115 may perform a cycled down-selection method to reduce the signaling overhead from SRI transmissions. For example, the UE 115 may use a dynamic virtual resource set 905 including a portion of the total SRS resources available to the UE 115, such as SRS resource 1 and SRS resource 3, based on a slot index. The UE 115 may use the index of the slot where a base station 105 transmits the control message comprising an uplink grant, the index of the slot where the UE 115 transmits a PUSCH indicated in the uplink grant, or both to determine which SRS resources are included in the dynamic virtual resource set 905. The UE 115 may divide the SRS resources into possible group candidates (e.g., 6 group candidates). The UE 115 may select a group from the candidates (e.g., Group III including SRS resource 0 and SRS resource 3) based on applying a formula, C, such as a modulation operator, $\mathrm{mod}(slot_{index}, subset_{number})$, to the possible set combinations (e.g., $subset_{number} = C_4^2 = 6 \ \mathrm{mod}(slot_{index}, 6) = 2$). Although a modulation operator is illustrated in resource diagram 900, the UE 115 may determine the SRS resources in the dynamic virtual resource set 905 based on any operation using a slot index or other parameter for communications between the UE 115 and the base station 105.

Resource diagram 900 may illustrate an example process when the UE 115 has two transmit antennas and eight receive antennas, and receives two resource sets with two SRS resources in each set. The SRI may be one bit with a value of 0 to indicate SRS resource 1 or a value of 1 to indicate SRS resource 2. The UE 115 may use one or more SRIs included in the control message to select SRS resources from the dynamic virtual resource set 905 for transmitting an SRS transmission (e.g., codebook usage). The UE 115 may use one or more other SRS resources for an antenna switching operation (e.g., downlink CSI usage).

For example, resource diagram 900 may illustrate an example process when the UE 115 is configured with a dynamic virtual resource set 905 including two SRS resources (e.g., SRS Resource 0 from Resource Set 0 and SRS Resource 3 from Resource Set 1 based on a slot index. In some cases, one of the SRS resources in the dynamic virtual resource set 805 is for codebook usage, and the SRI field may be a single bit. Each resource set may be associated with an antenna port. For example, Resource Set 0 may use Antenna Port 0, while Resource Set 1 may use Antenna Port 1. The UE 115 may use one SRS resource for codebook usage based on a one bit indicator (e.g., an SRI of 0 or an SRI of 1). For example, the control message may be a DCI message with an SRI field, where the SRI field having a value of 0 indicates SRS Resource 0, and the SRI field having a value of 1 indicates SRS Resource 3. The UE 115 may transmit an SRS in the SRS resource indicated by the SRI field in the control message.

Figure 10:
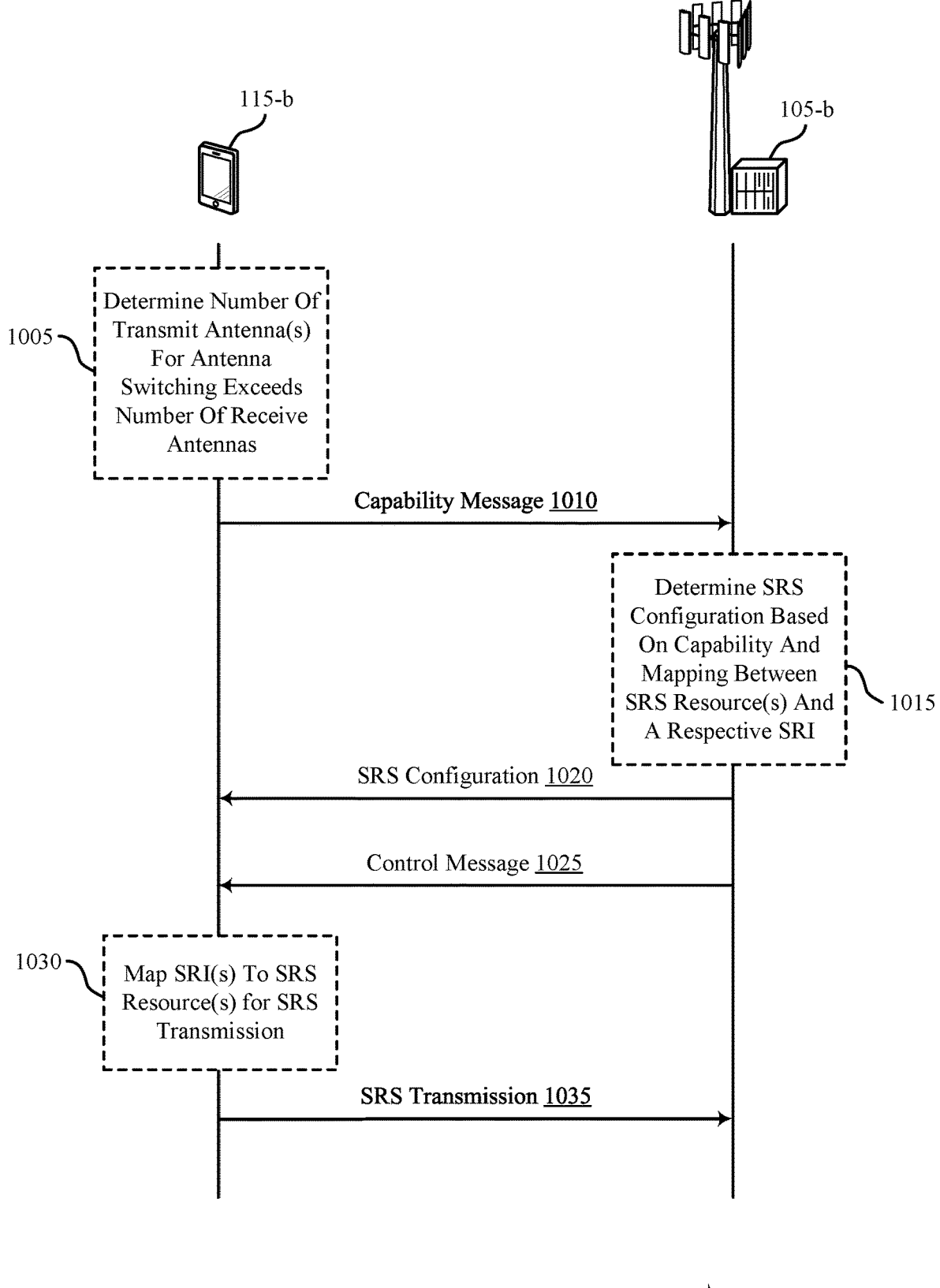
FIG. 10 illustrates an example of a process flow that supports techniques for mapping SRS resources in accordance with aspects of the present disclosure.

FIG. 10 illustrates an example of a process flow 1000 that supports techniques for mapping SRS resources in accordance with aspects of the present disclosure. In some examples, process flow 1000 may implement aspects of wireless communications system 100, wireless communications system 200, resource diagrams 300, resource diagram 400 through resource diagram 900, or a combination. The process flow 1000 may illustrate an example of a base station 105, such as base station 105-*b*, configuring a UE 115, such as UE 115-*b*, with a mapping between SRS resources and bit sequences, which may be referred to as SRIs, and the UE 115 transmitting an SRS during the SRS resource based on receiving an indication of a particular bit sequence. Alternative examples of the following may be implemented, where some processes are performed in a different order than described or are not performed. In some cases, processes may include additional features not mentioned below, or further processes may be added.

At 1005, UE 115-*b* may determine a number of transmit antennas for an antenna switching operation exceeds a number of receive antennas. UE 115-*b* may include the number of transmit antennas, the number of receive antennas, a number of ports supported for uplink transmissions at UE 115-*b*, or a combination in a capability message to base station 105-*b*. At 1010, UE 115-*b* may transmit the capability message if the number of transmit antennas exceeds the number of receive antennas. In some examples, the number of transmit antennas and the number of ports may be the same.

At 1015, base station 105-*b* may determine an SRS configuration based on the capability message from UE 115-*b*, where the SRS configuration indicates a mapping between one or more SRS resources and a respective bit sequence, which may be referred to as an SRI. The bit sequence may be a single bit or any number of bits (e.g., three bits). Based on the capability message, the base station 105-*b* may determine the number of resource sets, and the number of SRS resources, to use for SRS sounding for antenna switching and SRS codebook based sounding, and may determine the mapping between SRI bit sequences and SRS resources.

At 1020, base station 105-*b* may transmit the SRS configuration to UE 115-*b*. In some examples, the configuration may include an indication of one or more resource sets. For example, the SRS configuration may indicate a single resource set or multiple resource sets. In some cases, the SRS configuration may indicate a virtual resource set including SRS resources from multiple resource sets (e.g., a static virtual resource set). In some other cases, the SRS configuration may indicate a virtual resource set including SRS resources based on a slot index (e.g., a dynamic virtual resource set). The SRS configuration may indicate which mapping technique between SRS bit sequences and SRS resources is being applied, such as the example mapping techniques discussed with reference to FIGS. 4-9.

At 1025, base station 105-*b* may transmit a control message including one or more SRIs indicating one or more SRS resources based on the mapping between the SRIs and the SRS resources. In some examples, the control message may include multiple identifiers for respective resource sets. The one or more SRS resources may be included in at least one of the resource sets. For example, the SRS resources may be included in a resource set with the highest or lowest identifier. In some examples, the control message may include an indication of a resource set (e.g., a set indicator) of the multiple resource sets and an indication of an SRS (e.g., an SRI). If the set indicator has a value of zero, UE 115-*b* may use one or more SRS resources from the first resource set of the multiple resource sets. If the set indicator has a value that is non-zero, UE 115-*b* may use one or more SRS resources from the resource set indicated by the set indicator. If SRI has a value of zero, UE 115-*b* may use a first SRS resource from the resource set of the multiple resource sets. If the SRI has a value that is non-zero, UE 115-*b* may use an SRS resource from the resource set indicated by the SRI.

At 1030, UE 115-*b* may map the one or more SRIs, or bit sequences, to one or more SRS resources for an SRS transmission in accordance with the SRS configuration. For example, the SRI may have a value of 0 or 1 if the SRI is one bit, which may correspond to an SRS resource index in one or more resource set. In some other examples, the SRI may have a value of 000 through 111 if the SRI is three bits, which may correspond to an SRS resource index in one or more resource sets. At 1035, UE 115-*b* may transmit the SRS to base station 105-*b* in the one or more SRS resources.

Figure 11:
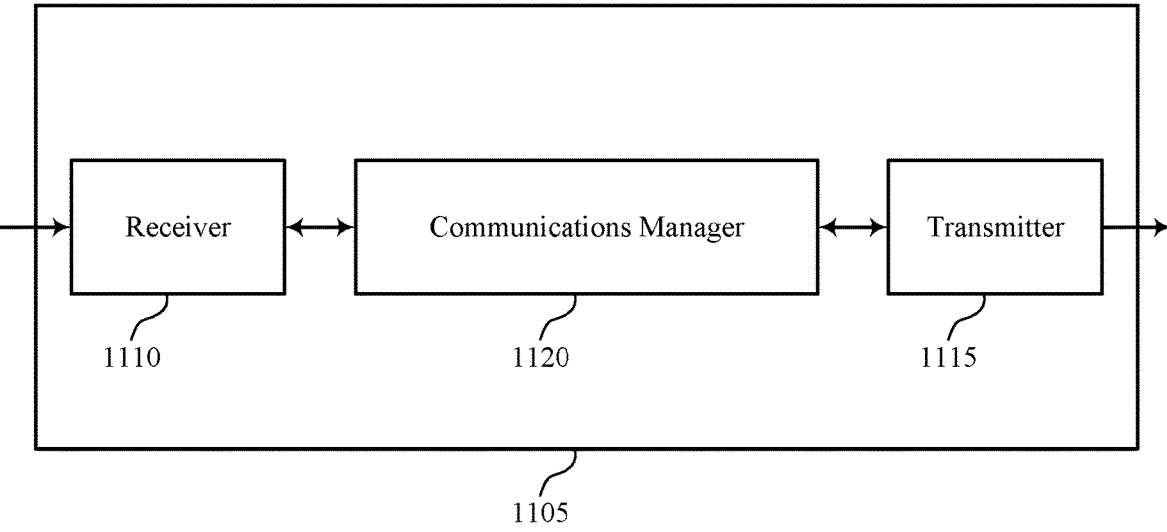
FIGS. 11 and 12 show block diagrams of devices that support techniques for mapping SRS resources in accordance with aspects of the present disclosure.

FIG. 11 shows a block diagram 1100 of a device 1105 that supports techniques for mapping SRS resources in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for mapping SRS resources). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for mapping SRS resources). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for mapping SRS resources as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. For example, the communications manager 1120 may be configured as or otherwise support a means for transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The communications manager 1120 may be configured as or otherwise support a means for receiving, based on the capability message, an SRS configuration that indicates a set of multiple SRS resources and a mapping between each SRS resource for at least a subset of the set of multiple SRS resources and a respective bit sequence of a set of multiple bit sequences. The communications manager 1120 may be configured as or otherwise support a means for receiving a control message including a first bit sequence of the set of multiple bit sequences to indicate a first SRS resource of the subset of the set of multiple SRS resources based on the mapping. The communications manager 1120 may be configured as or otherwise support a means for transmitting a first SRS in the first SRS resource based on the control message.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources (e.g., SRS resources).

Figure 12:
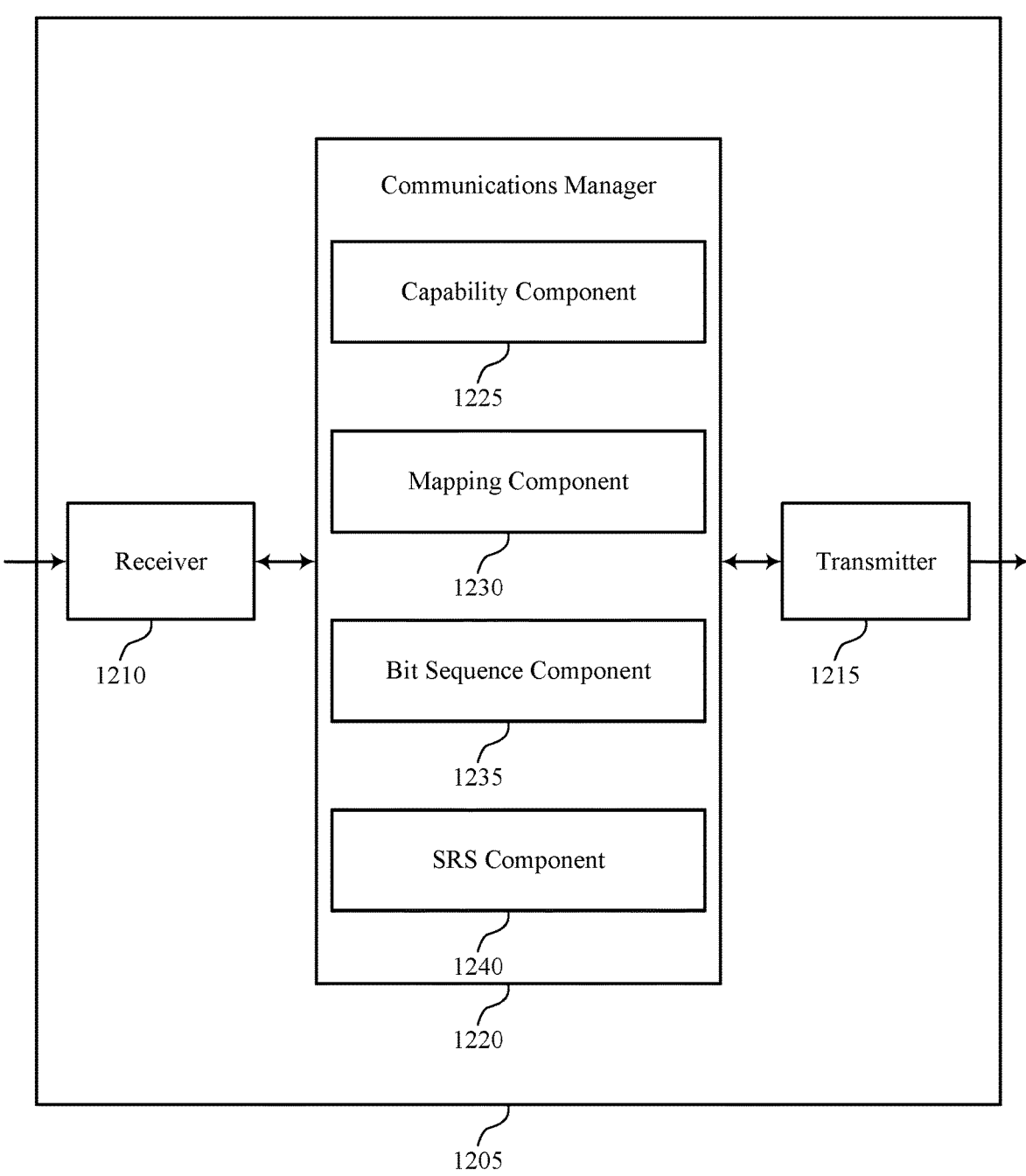

FIG. 12 shows a block diagram 1200 of a device 1205 that supports techniques for mapping SRS resources in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for mapping SRS resources). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for mapping SRS resources). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for mapping SRS resources as described herein. For example, the communications manager 1220 may include a capability component 1225, a mapping component 1230, a bit sequence component 1235, an SRS component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. The capability component 1225 may be configured as or otherwise support a means for transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The mapping component 1230 may be configured as or otherwise support a means for receiving, based on the capability message, an SRS configuration that indicates a set of multiple SRS resources and a mapping between each SRS resource for at least a subset of the set of multiple SRS resources and a respective bit sequence of a set of multiple bit sequences. The bit sequence component 1235 may be configured as or otherwise support a means for receiving a control message including a first bit sequence of the set of multiple bit sequences to indicate a first SRS resource of the subset of the set of multiple SRS resources based on the mapping. The SRS component 1240 may be configured as or otherwise support a means for transmitting a first SRS in the first SRS resource based on the control message.

Figure 13:
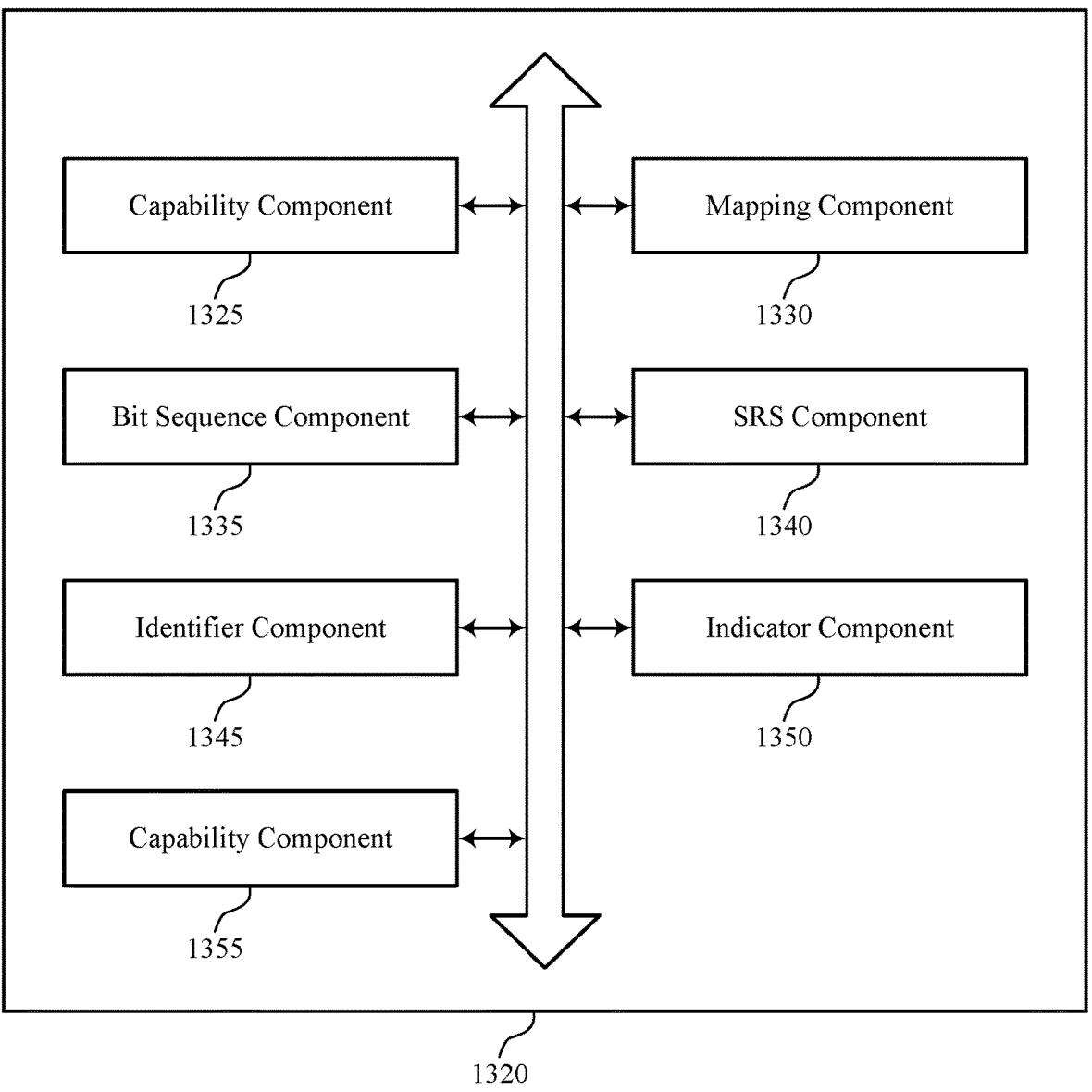
FIG. 13 shows a block diagram of a communications manager that supports techniques for mapping SRS resources in accordance with aspects of the present disclosure.

FIG. 13 shows a block diagram 1300 of a communications manager 1320 that supports techniques for mapping SRS resources in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for mapping SRS resources as described herein. For example, the communications manager 1320 may include a capability component 1325, a mapping component 1330, a bit sequence component 1335, an SRS component 1340, an identifier component 1345, an indicator component 1350, a capability component 1355, or any combination thereof. Each of these components may communicate, directly or indirectly, with one another (e.g., via one or more buses).

The communications manager 1320 may support wireless communication at a UE in accordance with examples as disclosed herein. The capability component 1325 may be configured as or otherwise support a means for transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The mapping component 1330 may be configured as or otherwise support a means for receiving, based on the capability message, an SRS configuration that indicates a set of multiple SRS resources and a mapping between each SRS resource for at least a subset of the set of multiple SRS resources and a respective bit sequence of a set of multiple bit sequences. The bit sequence component 1335 may be configured as or otherwise support a means for receiving a control message including a first bit sequence of the set of multiple bit sequences to indicate a first SRS resource of the subset of the set of multiple SRS resources based on the mapping. The SRS component 1340 may be configured as or otherwise support a means for transmitting a first SRS in the first SRS resource based on the control message.

In some examples, to support receiving the control message, the identifier component 1345 may be configured as or otherwise support a means for receiving an indication of a set of multiple identifiers corresponding to a set of multiple resource sets, where the subset of the set of multiple SRS resources corresponds to a first resource set of the set of multiple resource sets associated with a first identifier of the set of multiple identifiers. In some examples, the first identifier is a highest or lowest identifier of the set of multiple identifiers corresponding to the set of multiple resource sets.

In some examples, to support receiving the SRS configuration, the indicator component 1350 may be configured as or otherwise support a means for receiving the SRS configuration that indicates a set of multiple resource sets, where the control message indicates a first resource set of the set of multiple resource sets that is associated with the subset of the set of multiple SRS resources and indicates the first SRS resource of the subset of the set of multiple SRS resources.

In some examples, to support receiving the control message, the indicator component 1350 may be configured as or otherwise support a means for receiving the control message including a set indicator having a value of zero indicating the first resource set of the set of multiple resource sets.

In some examples, to support receiving the control message, the indicator component 1350 may be configured as or otherwise support a means for receiving the control message including a set indicator having a non-zero value indicating the first resource set of the set of multiple resource sets.

In some examples, to support receiving the control message, the indicator component 1350 may be configured as or otherwise support a means for receiving the control message including a resource indicator having a value of zero indicating the first SRS resource of the subset of the set of multiple SRS resources.

In some examples, to support receiving the control message, the indicator component 1350 may be configured as or otherwise support a means for receiving the control message including a resource indicator having a non-zero value indicating the first SRS resource of the subset of the set of multiple SRS resources.

In some examples, to support receiving the SRS configuration, the capability component 1355 may be configured as or otherwise support a means for receiving, based on the capability message, the SRS configuration that indicates a single resource set associated with the set of multiple SRS resources, where the mapping indicates a mapping between each SRS resource of the set of multiple SRS resources and a respective bit sequence of the set of multiple bit sequences.

In some examples, the capability component 1355 may be configured as or otherwise support a means for receiving, based on the capability message, the SRS configuration that indicates a set of multiple resource sets, each SRS resource of the set of multiple SRS resources being associate with a respective resource set of the set of multiple resource sets, where the mapping indicates a mapping between each SRS resource of the set of multiple SRS resources and a respective bit sequence of the set of multiple bit sequences.

In some examples, to support receiving the SRS configuration, the mapping component 1330 may be configured as or otherwise support a means for receiving the SRS configuration that indicates a virtual resource set including the subset of the set of multiple SRS resources, where the virtual resource set includes the first SRS resource from a first resource set and a second SRS resource from a second resource set.

In some examples, to support receiving the SRS configuration, the mapping component 1330 may be configured as or otherwise support a means for receiving the SRS configuration that indicates a virtual resource set including the subset of the set of multiple SRS resources, where the first SRS resource is included in the subset of the set of multiple SRS resources based on a slot index corresponding to the control message.

In some examples, to support receiving the control message, the identifier component 1345 may be configured as or otherwise support a means for receiving the control message that indicates a resource set identifier of a first resource set corresponding to the set of multiple SRS resources.

In some examples, the first bit sequence includes a single bit. In some examples, the first number of one or more transmit antennas and the third number of one or more ports is the same.

Figure 14:
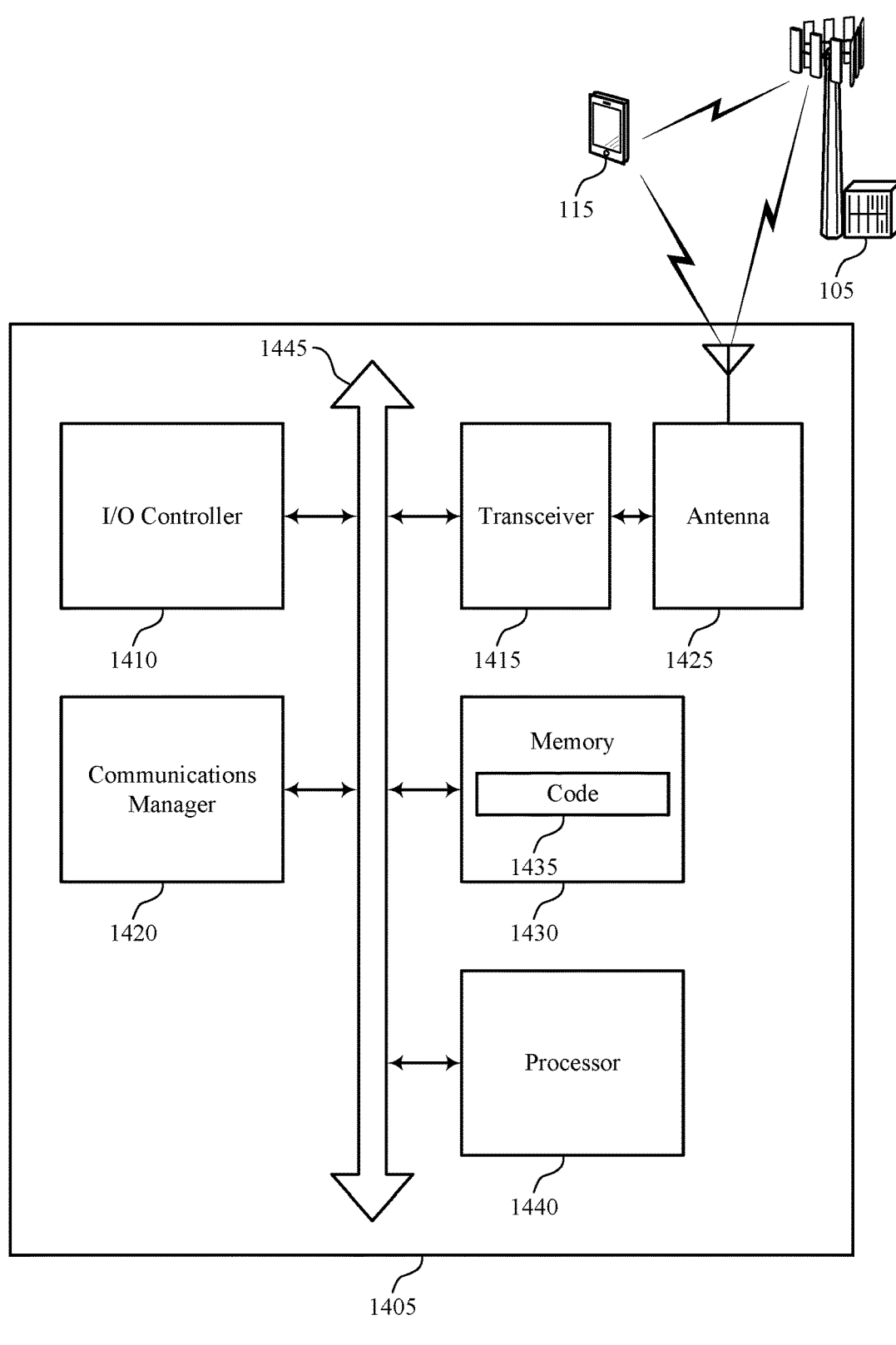
FIG. 14 shows a diagram of a system including a device that supports techniques for mapping SRS resources in accordance with aspects of the present disclosure.

FIG. 14 shows a diagram of a system 1400 including a device 1405 that supports techniques for mapping SRS resources in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for mapping SRS resources). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a UE in accordance with examples as disclosed herein. For example, the communications manager 1420 may be configured as or otherwise support a means for transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The communications manager 1420 may be configured as or otherwise support a means for receiving, based on the capability message, an SRS configuration that indicates a set of multiple SRS resources and a mapping between each SRS resource for at least a subset of the set of multiple SRS resources and a respective bit sequence of a set of multiple bit sequences. The communications manager 1420 may be configured as or otherwise support a means for receiving a control message including a first bit sequence of the set of multiple bit sequences to indicate a first SRS resource of the subset of the set of multiple SRS resources based on the mapping. The communications manager 1420 may be configured as or otherwise support a means for transmitting a first SRS in the first SRS resource based on the control message.

By including or configuring the communications manager 1420 in accordance with examples as described herein, the device 1405 may support techniques for reduced latency due to reduce transmission of SRIs as well as more efficient utilization of communication resources (e.g., SRS resources).

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for mapping SRS resources as described herein, or the processor 1440 and the memory 1430 may be otherwise configured to perform or support such operations.

Figure 15:
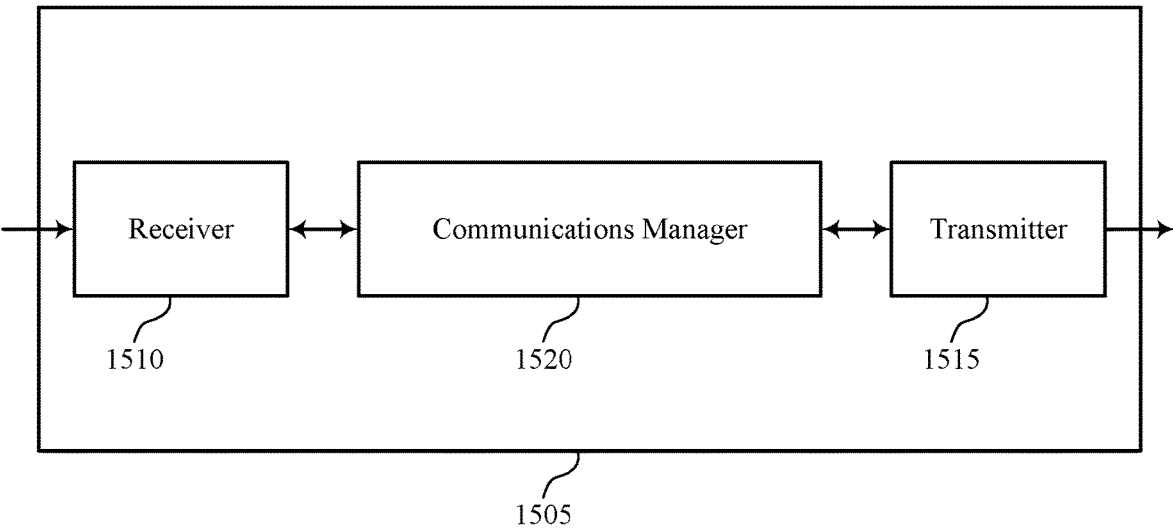
FIGS. 15 and 16 show block diagrams of devices that support techniques for mapping SRS resources in accordance with aspects of the present disclosure.

FIG. 15 shows a block diagram 1500 of a device 1505 that supports techniques for mapping SRS resources in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for mapping SRS resources). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for mapping SRS resources). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of techniques for mapping SRS resources as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for receiving, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The communications manager 1520 may be configured as or otherwise support a means for transmitting, to the UE and based on the capability message, an SRS configuration that indicates a set of multiple SRS resources and a mapping between each SRS resource for at least a subset of the set of multiple SRS resources and a respective bit sequence of a set of multiple bit sequences. The communications manager 1520 may be configured as or otherwise support a means for transmitting a control message including a first bit sequence of the set of multiple bit sequences to indicate a first SRS resource of the subset of the set of multiple SRS resources based on the mapping. The communications manager 1520 may be configured as or otherwise support a means for receiving a first SRS in the first SRS resource based on the control message.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for more efficient utilization of communication resources (e.g., SRS resources) by merging SRS resources for a codebook-based SRS transmissions with SRS transmissions for an antenna switching operation.

Figure 16:
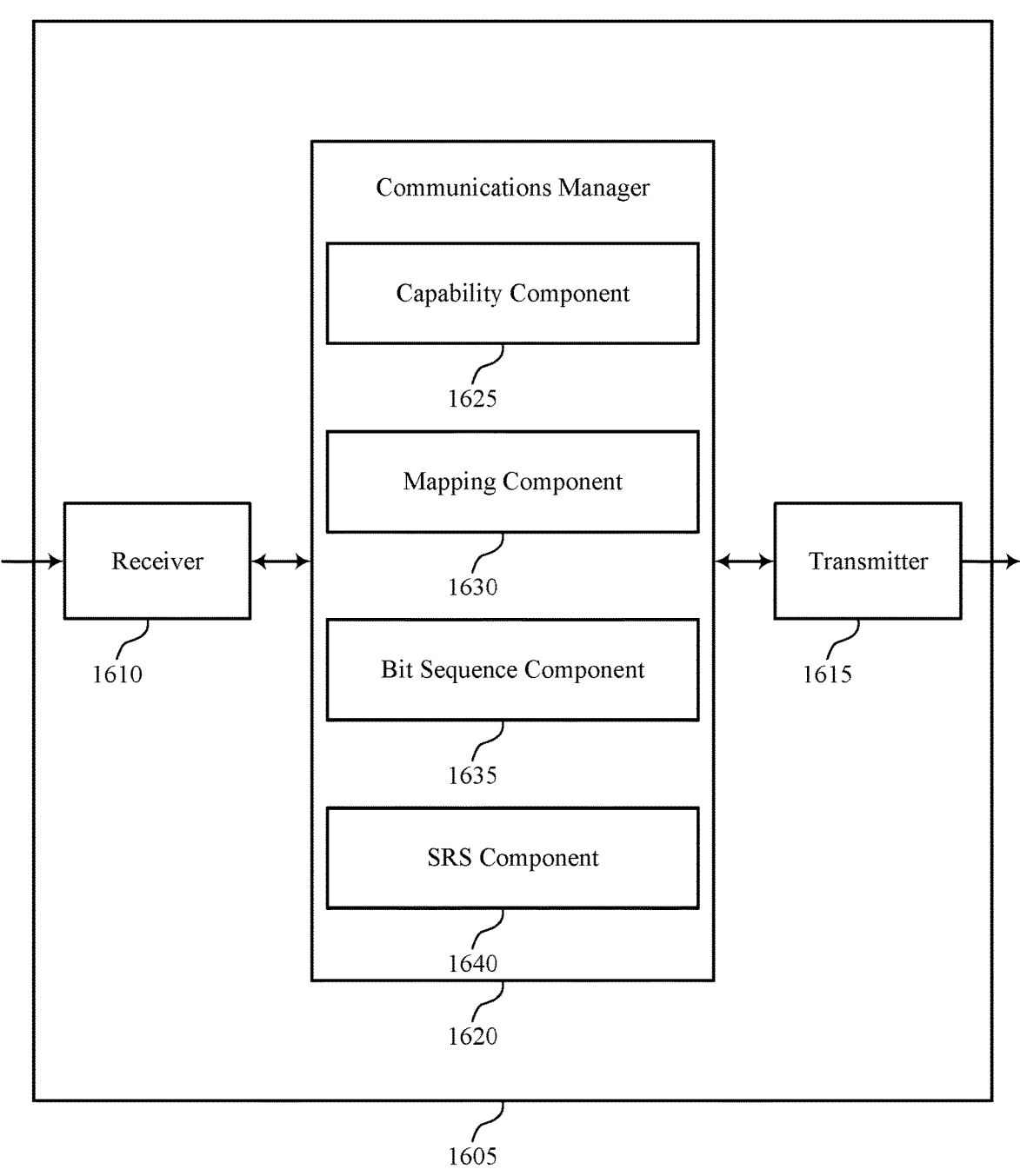

FIG. 16 shows a block diagram 1600 of a device 1605 that supports techniques for mapping SRS resources in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for mapping SRS resources). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for mapping SRS resources). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of techniques for mapping SRS resources as described herein. For example, the communications manager 1620 may include a capability component 1625, a mapping component 1630, a bit sequence component 1635, an SRS component 1640, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. The capability component 1625 may be configured as or otherwise support a means for receiving, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The mapping component 1630 may be configured as or otherwise support a means for transmitting, to the UE and based on the capability message, an SRS configuration that indicates a set of multiple SRS resources and a mapping between each SRS resource for at least a subset of the set of multiple SRS resources and a respective bit sequence of a set of multiple bit sequences. The bit sequence component 1635 may be configured as or otherwise support a means for transmitting a control message including a first bit sequence of the set of multiple bit sequences to indicate a first SRS resource of the subset of the set of multiple SRS resources based on the mapping. The SRS component 1640 may be configured as or otherwise support a means for receiving a first SRS in the first SRS resource based on the control message.

Figure 17:
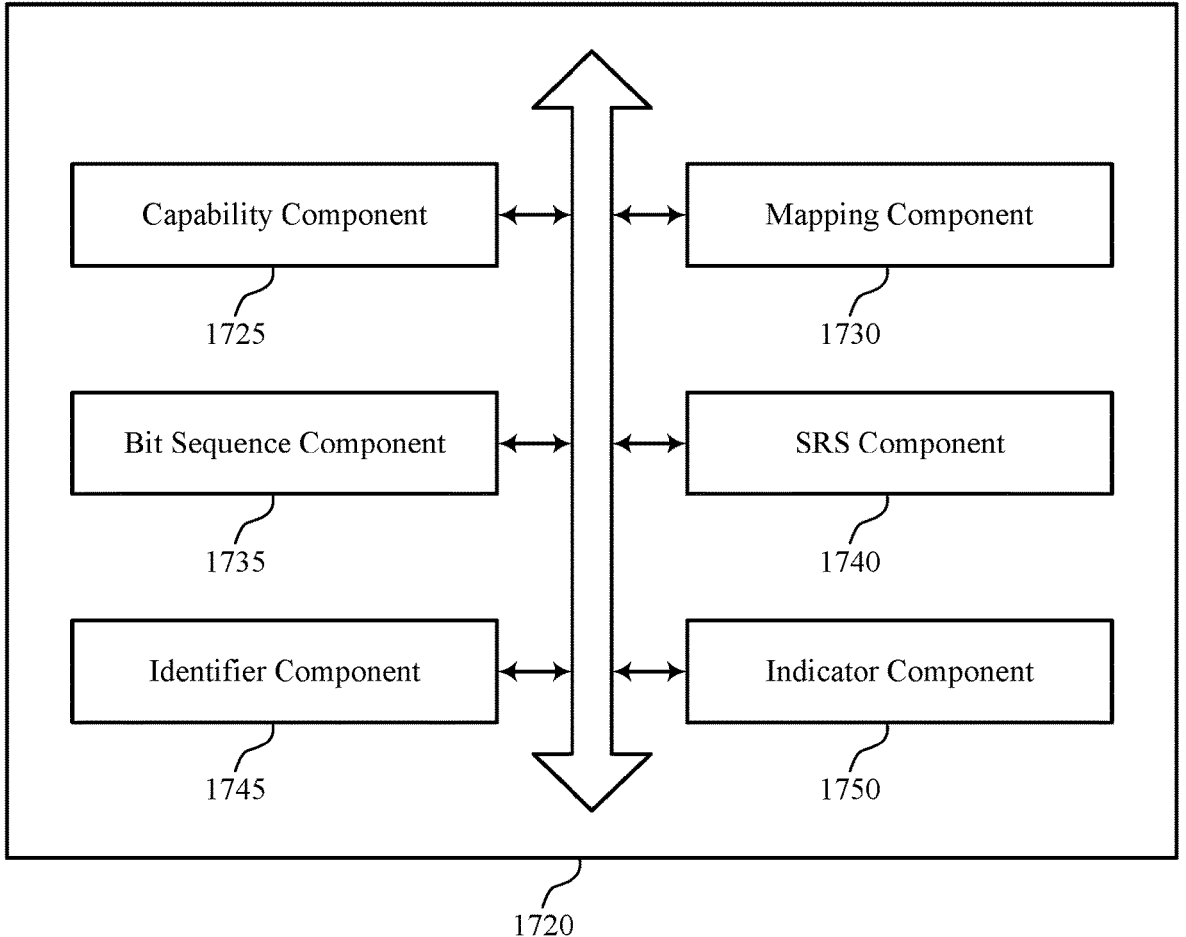
FIG. 17 shows a block diagram of a communications manager that supports techniques for mapping SRS resources in accordance with aspects of the present disclosure.

FIG. 17 shows a block diagram 1700 of a communications manager 1720 that supports techniques for mapping SRS resources in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of techniques for mapping SRS resources as described herein. For example, the communications manager 1720 may include a capability component 1725, a mapping component 1730, a bit sequence component 1735, an SRS component 1740, an identifier component 1745, an indicator component 1750, or any combination thereof. Each of these components may communicate, directly or indirectly, with one another (e.g., via one or more buses).

The communications manager 1720 may support wireless communication at a base station in accordance with examples as disclosed herein. The capability component 1725 may be configured as or otherwise support a means for receiving, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The mapping component 1730 may be configured as or otherwise support a means for transmitting, to the UE and based on the capability message, an SRS configuration that indicates a set of multiple SRS resources and a mapping between each SRS resource for at least a subset of the set of multiple SRS resources and a respective bit sequence of a set of multiple bit sequences. The bit sequence component 1735 may be configured as or otherwise support a means for transmitting a control message including a first bit sequence of the set of multiple bit sequences to indicate a first SRS resource of the subset of the set of multiple SRS resources based on the mapping. The SRS component 1740 may be configured as or otherwise support a means for receiving a first SRS in the first SRS resource based on the control message.

In some examples, to support transmitting the control message, the identifier component 1745 may be configured as or otherwise support a means for transmitting an indication of a set of multiple identifiers corresponding to a set of multiple resource sets, where the subset of the set of multiple SRS resources corresponds to a first resource set of the set of multiple resource sets associated with a first identifier of the set of multiple identifiers. In some examples, the first identifier is a highest or lowest identifier of the set of multiple identifiers corresponding to the set of multiple resource sets.

In some examples, to support transmitting the SRS configuration, the indicator component 1750 may be configured as or otherwise support a means for transmitting the SRS configuration that indicates a set of multiple resource sets, where the control message indicates a first resource set of the set of multiple resource sets that is associated with the subset of the set of multiple SRS resources and indicates the first SRS resource of the subset of the set of multiple SRS resources.

In some examples, to support transmitting the control message, the indicator component 1750 may be configured as or otherwise support a means for transmitting the control message including a set indicator having a value of zero indicating the first resource set of the set of multiple resource set. In some examples, to support transmitting the control message, the indicator component 1750 may be configured as or otherwise support a means for transmitting the control message including a set indicator having a non-zero value indicating the first resource set of the set of multiple resource sets.

In some examples, to support transmitting the control message, the indicator component 1750 may be configured as or otherwise support a means for transmitting the control message including a resource indicator having a value of zero indicating the first SRS resource of the subset of the set of multiple SRS resources. In some examples, to support transmitting the control message, the indicator component 1750 may be configured as or otherwise support a means for transmitting the control message including a resource indicator having a non-zero value indicating the first SRS resource of the subset of the set of multiple SRS resources.

In some examples, to support transmitting the SRS configuration, the capability component 1725 may be configured as or otherwise support a means for transmitting, based on the capability message, the SRS configuration that indicates a single resource set associated with the set of multiple SRS resources, where the mapping indicates a mapping between each SRS resource of the set of multiple SRS resources and a respective bit sequence of the set of multiple bit sequences.

In some examples, the capability component 1725 may be configured as or otherwise support a means for transmitting, based on the capability message, the SRS configuration that indicates a set of multiple resource sets, each SRS resource of the set of multiple SRS resources being associate with a respective resource set of the set of multiple resource sets, where the mapping indicates a mapping between each SRS resource of the set of multiple SRS resources and a respective bit sequence of the set of multiple bit sequences.

In some examples, to support transmitting the SRS configuration, the mapping component 1730 may be configured as or otherwise support a means for transmitting the SRS configuration that indicates a virtual resource set including the subset of the set of multiple SRS resources, where the virtual resource set includes the first SRS resource from a first resource set and a second SRS resource from a second resource set.

In some examples, to support transmitting the SRS configuration, the mapping component 1730 may be configured as or otherwise support a means for transmitting the SRS configuration that indicates a virtual resource set including the subset of the set of multiple SRS resources, where the first SRS resource is included in the subset of the set of multiple SRS resources based on a slot index corresponding to the control message.

In some examples, to support transmitting the control message, the identifier component 1745 may be configured as or otherwise support a means for transmitting the control message that indicates a resource set identifier of a first resource set corresponding to the set of multiple SRS resources.

In some examples, the first bit sequence includes a single bit. In some examples, the first number of one or more transmit antennas and the third number of one or more ports is the same.

Figure 18:
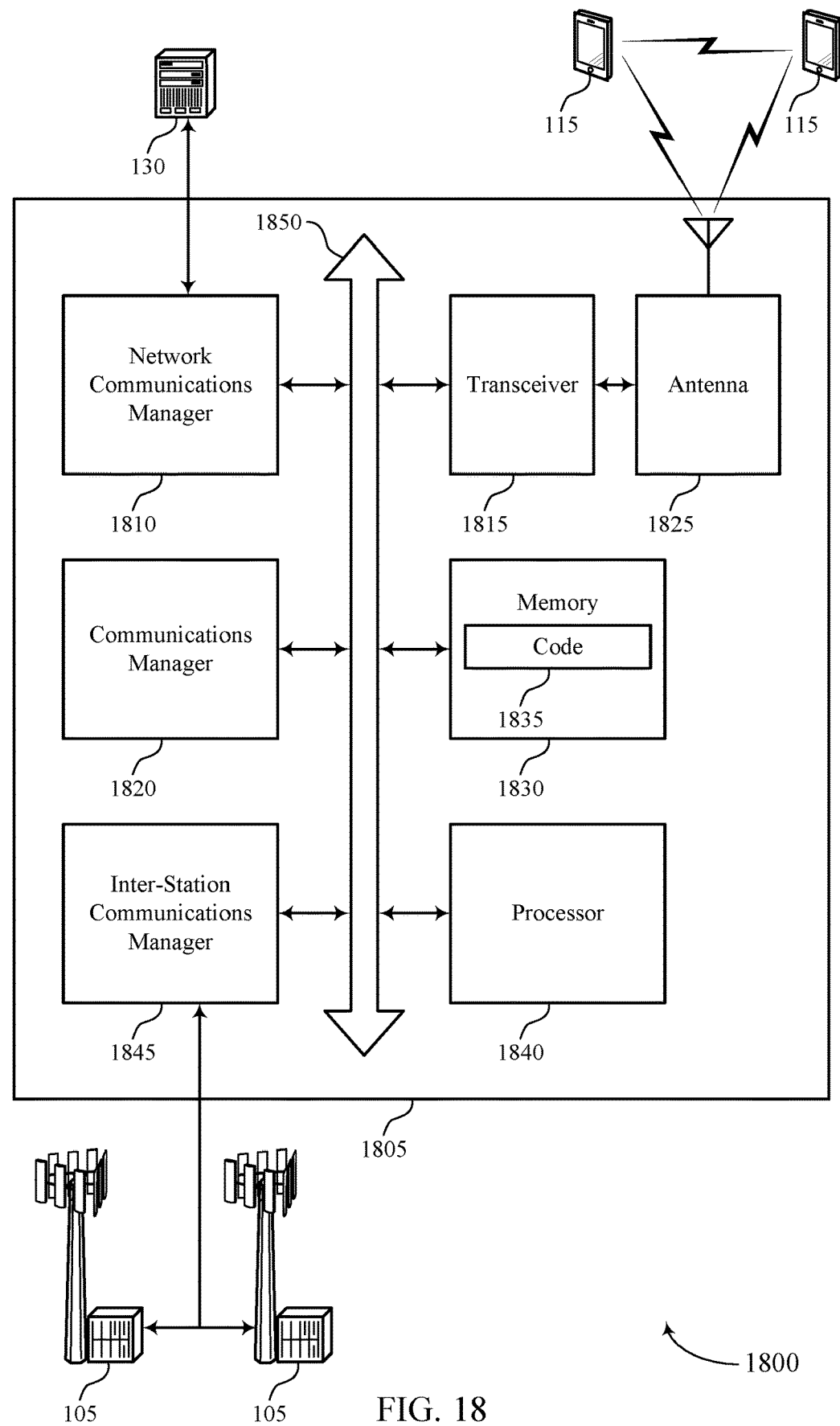
FIG. 18 shows a diagram of a system including a device that supports techniques for mapping SRS resources in accordance with aspects of the present disclosure.

FIG. 18 shows a diagram of a system 1800 including a device 1805 that supports techniques for mapping SRS resources in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting techniques for mapping SRS resources). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for receiving, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The communications manager 1820 may be configured as or otherwise support a means for transmitting, to the UE and based on the capability message, an SRS configuration that indicates a set of multiple SRS resources and a mapping between each SRS resource for at least a subset of the set of multiple SRS resources and a respective bit sequence of a set of multiple bit sequences. The communications manager 1820 may be configured as or otherwise support a means for transmitting a control message including a first bit sequence of the set of multiple bit sequences to indicate a first SRS resource of the subset of the set of multiple SRS resources based on the mapping. The communications manager 1820 may be configured as or otherwise support a means for receiving a first SRS in the first SRS resource based on the control message.

By including or configuring the communications manager 1820 in accordance with examples as described herein, the device 1805 may support techniques for reduced latency related to SRI transmissions as well as more efficient utilization of communication resources (e.g., SRS resources) based on merging SRS resources for a codebook-based SRS transmission and SRS transmissions for an antenna switching procedure.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of techniques for mapping SRS resources as described herein, or the processor 1840 and the memory 1830 may be otherwise configured to perform or support such operations.

FIG. 19 shows a flowchart illustrating a method 1900 that supports techniques for mapping SRS resources in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The operations of 1905 may be performed in accordance with examples as disclosed herein. In some examples, aspects of the operations of 1905 may be performed by a capability component 1325 as described with reference to FIG. 13.

At 1910, the method may include receiving, based on the capability message, an SRS configuration for a set of multiple SRS resources that indicates a mapping between each SRS resource for at least a subset of the set of multiple SRS resources and a respective bit sequence of a set of multiple bit sequences. The operations of 1910 may be performed in accordance with examples as disclosed herein. In some examples, aspects of the operations of 1910 may be performed by a mapping component 1330 as described with reference to FIG. 13.

At 1915, the method may include receiving a control message including a first bit sequence of the set of multiple bit sequences to indicate a first SRS resource of the subset of the set of multiple SRS resources based on the mapping. The operations of 1915 may be performed in accordance with examples as disclosed herein. In some examples, aspects of the operations of 1915 may be performed by a bit sequence component 1335 as described with reference to FIG. 13.

At 1920, the method may include transmitting a first SRS in the first SRS resource based on the control message. The operations of 1920 may be performed in accordance with examples as disclosed herein. In some examples, aspects of the operations of 1920 may be performed by an SRS component 1340 as described with reference to FIG. 13.

FIG. 20 shows a flowchart illustrating a method 2000 that supports techniques for mapping SRS resources in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The operations of 2005 may be performed in accordance with examples as disclosed herein. In some examples, aspects of the operations of 2005 may be performed by a capability component 1325 as described with reference to FIG. 13.

At 2010, the method may include receiving, based on the capability message, an SRS configuration that indicates a set of multiple SRS resources and a mapping between each SRS resource for at least a subset of the set of multiple SRS resources and a respective bit sequence of a set of multiple bit sequences. The operations of 2010 may be performed in accordance with examples as disclosed herein. In some examples, aspects of the operations of 2010 may be performed by a mapping component 1330 as described with reference to FIG. 13.

At 2015, the method may include receiving a control message including a first bit sequence of the set of multiple bit sequences to indicate a first SRS resource of the subset of the set of multiple SRS resources based on the mapping. The operations of 2015 may be performed in accordance with examples as disclosed herein. In some examples, aspects of the operations of 2015 may be performed by a bit sequence component 1335 as described with reference to FIG. 13.

At 2020, the method may include receiving an indication of a set of multiple identifiers corresponding to a set of multiple resource sets, where the subset of the set of multiple SRS resources corresponds to a first resource set of the set of multiple resource sets associated with a first identifier of the set of multiple identifiers. The operations of 2020 may be performed in accordance with examples as disclosed herein. In some examples, aspects of the operations of 2020 may be performed by an identifier component 1345 as described with reference to FIG. 13.

At 2025, the method may include transmitting a first SRS in the first SRS resource based on the control message. The operations of 2025 may be performed in accordance with examples as disclosed herein. In some examples, aspects of the operations of 2025 may be performed by an SRS component 1340 as described with reference to FIG. 13.

FIG. 21 shows a flowchart illustrating a method 2100 that supports techniques for mapping SRS resources in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2105, the method may include transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The operations of 2105 may be performed in accordance with examples as disclosed herein. In some examples, aspects of the operations of 2105 may be performed by a capability component 1325 as described with reference to FIG. 13.

At 2110, the method may include receiving, based on the capability message, an SRS configuration that indicates a set of multiple SRS resources and a mapping between each SRS resource for at least a subset of the set of multiple SRS resources and a respective bit sequence of a set of multiple bit sequences. The operations of 2110 may be performed in accordance with examples as disclosed herein. In some examples, aspects of the operations of 2110 may be performed by a mapping component 1330 as described with reference to FIG. 13.

At 2115, the method may include receiving the SRS configuration that indicates a set of multiple resource sets. The operations of 2115 may be performed in accordance with examples as disclosed herein. In some examples, aspects of the operations of 2115 may be performed by an indicator component 1350 as described with reference to FIG. 13.

At 2120, the method may include receiving a control message including a first bit sequence of the set of multiple bit sequences to indicate a first SRS resource of the subset of the set of multiple SRS resources based on the mapping and indicating a first resource set of the set of multiple resource sets that is associated with the subset of the set of multiple SRS resources and indicates the first SRS resource of the subset of the set of multiple SRS resources. The operations of 2120 may be performed in accordance with examples as disclosed herein. In some examples, aspects of the operations of 2120 may be performed by a bit sequence component 1335 as described with reference to FIG. 13.

At 2125, the method may include transmitting a first SRS in the first SRS resource based on the control message. The operations of 2125 may be performed in accordance with examples as disclosed herein. In some examples, aspects of the operations of 2125 may be performed by an SRS component 1340 as described with reference to FIG. 13.

FIG. 22 shows a flowchart illustrating a method 2200 that supports techniques for mapping SRS resources in accordance with aspects of the present disclosure. The operations of the method 2200 may be implemented by a base station or its components as described herein. For example, the operations of the method 2200 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2205, the method may include receiving, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The operations of 2205 may be performed in accordance with examples as disclosed herein. In some examples, aspects of the operations of 2205 may be performed by a capability component 1725 as described with reference to FIG. 17.

At 2210, the method may include transmitting, to the UE and based on the capability message, an SRS configuration for a set of multiple SRS resources that indicates a mapping between each SRS resource for at least a subset of the set of multiple SRS resources and a respective bit sequence of a set of multiple bit sequences. The operations of 2210 may be performed in accordance with examples as disclosed herein. In some examples, aspects of the operations of 2210 may be performed by a mapping component 1730 as described with reference to FIG. 17.

At 2215, the method may include transmitting a control message including a first bit sequence of the set of multiple bit sequences to indicate a first SRS resource of the subset of the set of multiple SRS resources based on the mapping. The operations of 2215 may be performed in accordance with examples as disclosed herein. In some examples, aspects of the operations of 2215 may be performed by a bit sequence component 1735 as described with reference to FIG. 17.

At 2220, the method may include receiving a first SRS in the first SRS resource based on the control message. The operations of 2220 may be performed in accordance with examples as disclosed herein. In some examples, aspects of the operations of 2220 may be performed by an SRS component 1740 as described with reference to FIG. 17.

FIG. 23 shows a flowchart illustrating a method 2300 that supports techniques for mapping SRS resources in accordance with aspects of the present disclosure. The operations of the method 2300 may be implemented by a base station or its components as described herein. For example, the operations of the method 2300 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2305, the method may include receiving, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission. The operations of 2305 may be performed in accordance with examples as disclosed herein. In some examples, aspects of the operations of 2305 may be performed by a capability component 1725 as described with reference to FIG. 17.

At 2310, the method may include transmitting, to the UE and based on the capability message, an SRS configuration that indicates a set of multiple SRS resources and a mapping between each SRS resource for at least a subset of the set of multiple SRS resources and a respective bit sequence of a set of multiple bit sequences. The operations of 2310 may be performed in accordance with examples as disclosed herein. In some examples, aspects of the operations of 2310 may be performed by a mapping component 1730 as described with reference to FIG. 17.

At 2315, the method may include transmitting a control message including a first bit sequence of the set of multiple bit sequences to indicate a first SRS resource of the subset of the set of multiple SRS resources based on the mapping. The operations of 2315 may be performed in accordance with examples as disclosed herein. In some examples, aspects of the operations of 2315 may be performed by a bit sequence component 1735 as described with reference to FIG. 17.

At 2320, the method may include transmitting an indication of a set of multiple identifiers corresponding to a set of multiple resource sets, where the subset of the set of multiple SRS resources corresponds to a first resource set of the set of multiple resource sets associated with a first identifier of the set of multiple identifiers. The operations of 2320 may be performed in accordance with examples as disclosed herein. In some examples, aspects of the operations of 2320 may be performed by an identifier component 1745 as described with reference to FIG. 17.

At 2325, the method may include receiving a first SRS in the first SRS resource based on the control message. The operations of 2325 may be performed in accordance with examples as disclosed herein. In some examples, aspects of the operations of 2325 may be performed by an SRS component 1740 as described with reference to FIG. 17.

Summary of Aspects

The following provides an overview of aspects of the present disclosure:

Aspect 1: A method for wireless communication at a UE, comprising: transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission; receiving, based at least in part on the capability message, a sounding reference signal configuration for a plurality of sounding reference signal resources that indicates a mapping between each sounding reference signal resource for at least a subset of the plurality of sounding reference signal resources and a respective bit sequence of a plurality of bit sequences; receiving a control message comprising a first bit sequence of the plurality of bit sequences to indicate a first sounding reference signal resource of the subset of the plurality of sounding reference signal resources based at least in part on the mapping; and transmitting a first sounding reference signal in the first sounding reference signal resource based at least in part on the control message.

Aspect 2: The method of aspect 1, wherein receiving the control message comprises: receiving an indication of a plurality of identifiers corresponding to a plurality of resource sets, wherein the subset of the plurality of sounding reference signal resources corresponds to a first resource set of the plurality of resource sets associated with a first identifier of the plurality of identifiers.

Aspect 3: The method of aspect 2, wherein the first identifier is a highest or lowest identifier of the plurality of identifiers corresponding to the plurality of resource sets.

Aspect 4: The method of any of aspects 1 through 3, wherein receiving the sounding reference signal configuration comprises: receiving the sounding reference signal configuration that indicates a plurality of resource sets, wherein the control message indicates a first resource set of the plurality of resource sets that is associated with the subset of the plurality of sounding reference signal resources and indicates the first sounding reference signal resource of the subset of the plurality of sounding reference signal resources.

Aspect 5: The method of aspect 4, wherein receiving the control message comprises: receiving the control message comprising a set indicator having a value of zero indicating the first resource set of the plurality of resource sets.

Aspect 6: The method of any of aspects 4 through 5, wherein receiving the control message comprises: receiving the control message comprising a set indicator having a non-zero value indicating the first resource set of the plurality of resource sets.

Aspect 7: The method of any of aspects 6, wherein receiving the control message comprises: receiving the control message comprising a resource indicator having a value of zero indicating the first sounding reference signal resource of the subset of the plurality of sounding reference signal resources.

Aspect 8: The method of any of aspects 6, wherein receiving the control message comprises: receiving the control message comprising a resource indicator having a non-zero value indicating the first sounding reference signal resource of the subset of the plurality of sounding reference signal resources.

Aspect 9: The method of any of aspects 1 through 8, wherein receiving the sounding reference signal configuration further comprises: receiving, based at least in part on the capability message, the sounding reference signal configuration that indicates a single resource set associated with the plurality of sounding reference signal resources, wherein the mapping indicates a mapping between each sounding reference signal resource of the plurality of sounding reference signal resources and a respective bit sequence of the plurality of bit sequences.

Aspect 10: The method of any of aspects 1 through 8, further comprising: receiving, based at least in part on the capability message, the sounding reference signal configuration that indicates a plurality of resource sets, each sounding reference signal resource of the plurality of sounding reference signal resources being associate with a respective resource set of the plurality of resource sets, wherein the mapping indicates a mapping between each sounding reference signal resource of the plurality of sounding reference signal resources and a respective bit sequence of the plurality of bit sequences.

Aspect 11: The method of any of aspects 1 through 10, wherein receiving the sounding reference signal configuration further comprises: receiving the sounding reference signal configuration that indicates a virtual resource set comprising the subset of the plurality of sounding reference signal resources, wherein the virtual resource set comprises the first sounding reference signal resource from a first resource set and a second sounding reference signal resource from a second resource set.

Aspect 12: The method of any of aspects 1 through 10, wherein receiving the sounding reference signal configuration further comprises: receiving the sounding reference signal configuration that indicates a virtual resource set comprising the subset of the plurality of sounding reference signal resources, wherein the first sounding reference signal resource is included in the subset of the plurality of sounding reference signal resources based at least in part on a slot index corresponding to the control message.

Aspect 13: The method of any of aspects 1 through 12, wherein receiving the control message comprises: receiving the control message that indicates a resource set identifier of a first resource set corresponding to the plurality of sounding reference signal resources.

Aspect 14: The method of any of aspects 1 through 13, wherein the first bit sequence comprises a single bit.

Aspect 15: The method of any of aspects 1 through 14, wherein the first number of one or more transmit antennas and the third number of one or more ports is the same.

Aspect 16: A method for wireless communication at a base station, comprising: receiving, from a UE, a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission; transmitting, to the UE and based at least in part on the capability message, a sounding reference signal configuration for a plurality of sounding reference signal resources that indicates a mapping between each sounding reference signal resource for at least a subset of the plurality of sounding reference signal resources and a respective bit sequence of a plurality of bit sequences; transmitting a control message comprising a first bit sequence of the plurality of bit sequences to indicate a first sounding reference signal resource of the subset of the plurality of sounding reference signal resources based at least in part on the mapping; and receiving a first sounding reference signal in the first sounding reference signal resource based at least in part on the control message.

Aspect 17: The method of aspect 16, wherein transmitting the control message comprises: transmitting an indication of a plurality of identifiers corresponding to a plurality of resource sets, wherein the subset of the plurality of sounding reference signal resources corresponds to a first resource set of the plurality of resource sets associated with a first identifier of the plurality of identifiers.

Aspect 18: The method of aspect 17, wherein the first identifier is a highest or lowest identifier of the plurality of identifiers corresponding to the plurality of resource sets.

Aspect 19: The method of any of aspects 16 through 18, wherein transmitting the sounding reference signal configuration comprises: transmitting the sounding reference signal configuration that indicates a plurality of resource sets, wherein the control message indicates a first resource set of the plurality of resource sets that is associated with the subset of the plurality of sounding reference signal resources and indicates the first sounding reference signal resource of the subset of the plurality of sounding reference signal resources.

Aspect 20: The method of aspect 19, wherein transmitting the control message comprises: transmitting the control message comprising a set indicator having a value of zero indicating the first resource set of the plurality of resource set.

Aspect 21: The method of any of aspects 19, wherein transmitting the control message comprises: transmitting the control message comprising a set indicator having a non-zero value indicating the first resource set of the plurality of resource sets.

Aspect 22: The method of any of aspects 19 through 21, wherein transmitting the control message comprises: transmitting the control message comprising a resource indicator having a value of zero indicating the first sounding reference signal resource of the subset of the plurality of sounding reference signal resources.

Aspect 23: The method of any of aspects 19 through 21, wherein transmitting the control message comprises: transmitting the control message comprising a resource indicator having a non-zero value indicating the first sounding reference signal resource of the subset of the plurality of sounding reference signal resources.

Aspect 24: The method of any of aspects 16 through 23, wherein transmitting the sounding reference signal configuration further comprises: transmitting, based at least in part on the capability message, the sounding reference signal configuration that indicates a single resource set associated with the plurality of sounding reference signal resources, wherein the mapping indicates a mapping between each sounding reference signal resource of the plurality of sounding reference signal resources and a respective bit sequence of the plurality of bit sequences.

Aspect 25: The method of any of aspects 16 through 23, further comprising: transmitting, based at least in part on the capability message, the sounding reference signal configuration that indicates a plurality of resource sets, each sounding reference signal resource of the plurality of sounding reference signal resources being associate with a respective resource set of the plurality of resource sets, wherein the mapping indicates a mapping between each sounding reference signal resource of the plurality of sounding reference signal resources and a respective bit sequence of the plurality of bit sequences.

Aspect 26: The method of any of aspects 16 through 25, wherein transmitting the sounding reference signal configuration further comprises: transmitting the sounding reference signal configuration that indicates a virtual resource set comprising the subset of the plurality of sounding reference signal resources, wherein the virtual resource set comprises the first sounding reference signal resource from a first resource set and a second sounding reference signal resource from a second resource set.

Aspect 27: The method of any of aspects 16 through 25, wherein transmitting the sounding reference signal configuration further comprises: transmitting the sounding reference signal configuration that indicates a virtual resource set comprising the subset of the plurality of sounding reference signal resources, wherein the first sounding reference signal resource is included in the subset of the plurality of sounding reference signal resources based at least in part on a slot index corresponding to the control message.

Aspect 28: The method of any of aspects 16 through 27, wherein transmitting the control message comprises: transmitting the control message that indicates a resource set identifier of a first resource set corresponding to the plurality of sounding reference signal resources.

Aspect 29: The method of any of aspects 16 through 28, wherein the first bit sequence comprises a single bit.

Aspect 30: The method of any of aspects 16 through 29, wherein the first number of one or more transmit antennas and the third number of one or more ports is the same.

Aspect 31: An apparatus for wireless communication at a UE, comprising a processor; memory coupled with the processor; and instructions stored in the memory and executable by the processor to cause the apparatus to perform a method of any of aspects 1 through 15.

Aspect 32: An apparatus for wireless communication at a UE, comprising at least one means for performing a method of any of aspects 1 through 15.

Aspect 33: A non-transitory computer-readable medium storing code for wireless communication at a UE, the code comprising instructions executable by a processor to perform a method of any of aspects 1 through 15.

Aspect 34: An apparatus for wireless communication at a base station, comprising a processor; memory coupled with the processor; and instructions stored in the memory and executable by the processor to cause the apparatus to perform a method of any of aspects 16 through 30.

Aspect 35: An apparatus for wireless communication at a base station, comprising at least one means for performing a method of any of aspects 16 through 30.

Aspect 36: A non-transitory computer-readable medium storing code for wireless communication at a base station, the code comprising instructions executable by a processor to perform a method of any of aspects 16 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

transmitting a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, wherein the capability message is transmitted based at least in part on the first number of one or more transmit antennas for antenna switching supported by the UE being less than the second number of receive antennas supported by the UE for antenna switching;

receiving, based at least in part on the capability message, a sounding reference signal configuration for a plurality of sounding reference signal resources for antenna switching and codebook based sounding, wherein the sounding reference signal configuration indicates a mapping between each sounding reference signal resource for at least a subset of the plurality of sounding reference signal resources and a respective bit sequence of a plurality of bit sequences for codebook based sounding;

receiving a control message comprising a first bit sequence of the plurality of bit sequences to indicate a first sounding reference signal resource of the subset of the plurality of sounding reference signal resources on which to perform codebook based sounding based at least in part on the mapping; and transmitting a first sounding reference signal in the first sounding reference signal resource based at least in part on the control message, wherein the first sounding reference signal is a codebook based sounding reference signal and the first bit sequence indicates to transmit the codebook based sounding reference signal via the first sounding reference signal resource.

2. The method of claim 1, wherein receiving the control message comprises:

receiving an indication of a plurality of identifiers corresponding to a plurality of resource sets, wherein the subset of the plurality of sounding reference signal resources corresponds to a first resource set of the plurality of resource sets associated with a first identifier of the plurality of identifiers.

3. The method of claim 2, wherein the first identifier is a highest or lowest identifier of the plurality of identifiers corresponding to the plurality of resource sets.

4. The method of claim 1, wherein receiving the sounding reference signal configuration comprises:

receiving the sounding reference signal configuration that indicates a plurality of resource sets, wherein the control message indicates a first resource set of the plurality of resource sets that is associated with the subset of the plurality of sounding reference signal resources and indicates the first sounding reference signal resource of the subset of the plurality of sounding reference signal resources.

5. The method of claim 4, wherein receiving the control message comprises:

receiving the control message comprising a set indicator having a value of zero indicating the first resource set of the plurality of resource sets.

6. The method of claim 4, wherein receiving the control message comprises:

receiving the control message comprising a set indicator having a non-zero value indicating the first resource set of the plurality of resource sets.

7. The method of claim 4, wherein receiving the control message comprises:

receiving the control message comprising a resource indicator having a value of zero indicating the first sounding reference signal resource of the subset of the plurality of sounding reference signal resources.

8. The method of claim 4, wherein receiving the control message comprises:

receiving the control message comprising a resource indicator having a non-zero value indicating the first sounding reference signal resource of the subset of the plurality of sounding reference signal resources.

9. The method of claim 1, wherein receiving the sounding reference signal configuration further comprises:

receiving, based at least in part on the capability message, the sounding reference signal configuration that indicates a single resource set associated with the plurality of sounding reference signal resources, wherein the mapping indicates a mapping between each sounding reference signal resource of the plurality of sounding reference signal resources and a respective bit sequence of the plurality of bit sequences.

10. The method of claim 1, further comprising:

receiving, based at least in part on the capability message, the sounding reference signal configuration that indicates a plurality of resource sets, each sounding reference signal resource of the plurality of sounding reference signal resources being associate with a respective resource set of the plurality of resource sets, wherein the mapping indicates a mapping between each sounding reference signal resource of the plurality of sounding reference signal resources and a respective bit sequence of the plurality of bit sequences.

11. The method of claim 1, wherein receiving the sounding reference signal configuration further comprises:

receiving the sounding reference signal configuration that indicates a virtual resource set comprising the subset of the plurality of sounding reference signal resources, wherein the virtual resource set comprises the first sounding reference signal resource from a first resource set and a second sounding reference signal resource from a second resource set.

12. The method of claim 1, wherein receiving the sounding reference signal configuration further comprises:

receiving the sounding reference signal configuration that indicates a virtual resource set comprising the subset of the plurality of sounding reference signal resources, wherein the first sounding reference signal resource is included in the subset of the plurality of sounding reference signal resources based at least in part on a slot index corresponding to the control message.

13. The method of claim 1, wherein receiving the control message comprises:

receiving the control message that indicates a resource set identifier of a first resource set corresponding to the plurality of sounding reference signal resources.

14. The method of claim 1, wherein the first bit sequence comprises a single bit.

15. The method of claim 1, wherein the first number of one or more transmit antennas and the third number of one or more ports is the same.

16. A method for wireless communication at a network device, comprising:

receiving a capability message indicating a first number of one or more transmit antennas for antenna switching supported by a user equipment (UE), a second number of receive antennas supported by the UE for antenna switching that exceeds the first number of one or more transmit antennas, and a third number of one or more ports supported for uplink transmission, wherein the capability message is received based at least in part on the first number of one or more transmit antennas for antenna switching supported by the UE being less than the second number of receive antennas supported by the UE for antenna switching;

transmitting, based at least in part on the capability message, a sounding reference signal configuration for a plurality of sounding reference signal resources for antenna switching and codebook based sounding, wherein the sounding reference signal configuration indicates a mapping between each sounding reference signal resource for at least a subset of the plurality of sounding reference signal resources and a respective bit sequence of a plurality of bit sequences for codebook based sounding;

transmitting a control message comprising a first bit sequence of the plurality of bit sequences to indicate a first sounding reference signal resource of the subset of the plurality of sounding reference signal resources on which to perform codebook based sounding based at least in part on the mapping; and receiving a first sounding reference signal in the first sounding reference signal resource based at least in part on the control message, wherein the first sounding reference signal is a codebook based sounding reference signal and the first bit sequence indicates to transmit the codebook based sounding reference signal via the first sounding reference signal resource.

17. The method of claim 16, wherein transmitting the control message comprises:

transmitting an indication of a plurality of identifiers corresponding to a plurality of resource sets, wherein the subset of the plurality of sounding reference signal resources corresponds to a first resource set of the plurality of resource sets associated with a first identifier of the plurality of identifiers.

18. The method of claim 16, wherein transmitting the sounding reference signal configuration comprises:

transmitting the sounding reference signal configuration that indicates a plurality of resource sets, wherein the control message indicates a first resource set of the plurality of resource sets that is associated with the subset of the plurality of sounding reference signal resources and indicates the first sounding reference signal resource of the subset of the plurality of sounding reference signal resources.

19. The method of claim 16, wherein transmitting the sounding reference signal configuration further comprises:

transmitting, based at least in part on the capability message, the sounding reference signal configuration that indicates a single resource set associated with the plurality of sounding reference signal resources, wherein the mapping indicates a mapping between each sounding reference signal resource of the plurality of sounding reference signal resources and a respective bit sequence of the plurality of bit sequences.

20. A user equipment (UE), comprising:

a processing system configured to:

transmit a capability message indicating a first number of one or more transmit antennas for antenna switching supported by the UE, a second number of receive antennas supported by the UE for antenna switching that exceeds the first number of one or more transmit antennas, and a third number of one or more ports supported for uplink transmission, wherein the capability message is transmitted based at least in part on the first number of one or more transmit antennas for antenna switching supported by the UE being less than the second number of receive antennas supported by the UE for antenna switching;

receive, based at least in part on the capability message, a sounding reference signal configuration for a plurality of sounding reference signal resources for antenna switching and codebook based sounding, wherein the sounding reference signal configuration indicates a mapping between each sounding reference signal resource for at least a subset of the plurality of sounding reference signal resources and a respective bit sequence of a plurality of bit sequences for codebook based sounding;

receive a control message comprising a first bit sequence of the plurality of bit sequences to indicate a first sounding reference signal resource of the subset of the plurality of sounding reference signal resources on which to perform codebook based sounding based at least in part on the mapping; and transmit a first sounding reference signal in the first sounding reference signal resource based at least in part on the control message, wherein the first sounding reference signal is a codebook based sounding reference signal and the first bit sequence indicates to transmit the codebook based sounding reference signal via the first sounding reference signal resource.

* * * * *